United States Patent
Liu et al.

(10) Patent No.: US 12,169,895 B2
(45) Date of Patent: Dec. 17, 2024

(54) GENERATING SHADOWS FOR DIGITAL OBJECTS WITHIN DIGITAL IMAGES UTILIZING A HEIGHT MAP

(71) Applicant: Adobe Inc., San Jose, CA (US)

(72) Inventors: Yifan Liu, Adelaide (AU); Jianming Zhang, Campbell, CA (US); He Zhang, San Jose, CA (US); Elya Shechtman, Seattle, WA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 585 days.

(21) Appl. No.: 17/502,782

(22) Filed: Oct. 15, 2021

(65) Prior Publication Data

US 2023/0123658 A1    Apr. 20, 2023

(51) Int. Cl.
*G06T 15/60*    (2006.01)
*G06N 3/045*    (2023.01)
(Continued)

(52) U.S. Cl.
CPC ............ *G06T 15/60* (2013.01); *G06N 3/045* (2023.01); *G06T 7/194* (2017.01); *G06T 7/70* (2017.01);
(Continued)

(58) Field of Classification Search
None
See application file for complete search history.

(56) References Cited

U.S. PATENT DOCUMENTS

2003/0112237 A1* 6/2003 Corbetta ............... G06T 15/60
                                                          345/426
2012/0313960 A1* 12/2012 Segawa ................. G06T 15/04
                                                          345/589
(Continued)

FOREIGN PATENT DOCUMENTS

CN          106485778 A       3/2017

OTHER PUBLICATIONS

Sheng et al. ("SSN: Soft Shadow Network for Image Compositing"). IEEE Conference on Computer Vision and Pattern Recognition, CVPR 2021, virtual, Jun. 19-25, 2021. (Year: 2021).*
Yifan Wang, Brian L. Curless, and Steven M. Seitz. "People as scene probes." In European Conference on Computer Vision, pp. 438-454. Springer, 2020.
(Continued)

*Primary Examiner* — Yanna Wu
(74) *Attorney, Agent, or Firm* — Keller Preece PLLC

(57) ABSTRACT

The present disclosure relates to systems, methods, and non-transitory computer-readable media that generate a height map for a digital object portrayed in a digital image and further utilizes the height map to generate a shadow for the digital object. Indeed, in one or more embodiments, the disclosed systems generate (e.g., utilizing a neural network) a height map that indicates the pixels heights for pixels of a digital object portrayed in a digital image. The disclosed systems utilize the pixel heights, along with lighting information for the digital image, to determine how the pixels of the digital image project to create a shadow for the digital object. Further, in some implementations, the disclosed systems utilize the determined shadow projections to generate (e.g., utilizing another neural network) a soft shadow for the digital object. Accordingly, in some cases, the disclosed systems modify the digital image to include the shadow.

20 Claims, 16 Drawing Sheets

(51) Int. Cl.
*G06T 7/194* (2017.01)
*G06T 7/70* (2017.01)
*G06T 11/00* (2006.01)

(52) U.S. Cl.
CPC .......... *G06T 11/00* (2013.01); *G06T 2200/24* (2013.01); *G06T 2207/20081* (2013.01); *G06T 2207/20084* (2013.01); *G06T 2215/12* (2013.01)

(56) References Cited

U.S. PATENT DOCUMENTS

| | | | |
|---|---|---|---|
| 2015/0109303 A1* | 4/2015 | Boyadzhiev | G06T 11/60 345/426 |
| 2015/0371436 A1 | 12/2015 | Sachter-Zeltzer | |
| 2017/0186189 A1* | 6/2017 | Usikov | G06V 40/23 |
| 2018/0164981 A1* | 6/2018 | Park | G06F 3/0482 |
| 2021/0319252 A1* | 10/2021 | Ha | G06T 7/70 |

OTHER PUBLICATIONS

Xiaowei Hu, Yitong Jiang, Chi-Wing Fu, and Pheng-Ann Heng. "Mask-ShadowGAN: Learning to remove shadows from unpaired data." In Proceedings of the IEEE/CVF International Conference on Computer Vision, pp. 2472-2481. 2019.
Daquan Liu, Chengjiang Long, Hongpan Zhang, Hanning Yu, Xinzhi Dong, and Chunxia Xiao. "ARShadowGAN: Shadow generative adversarial network for augmented reality in single light scenes." In Proceedings of the IEEE/CVF Conference on Computer Vision and Pattern Recognition, pp. 8139-8148. 2020.
Yifan Wang, Andrew Liu, Richard Tucker, Jiajun Wu, Brian L. Curless, Steven M. Seitz, and Noah Snavely. "Repopulating Street Scenes." In Proceedings of the IEEE/CVF Conference on Computer Vision and Pattern Recognition, pp. 5110-5119. 2021.
U.S. Appl. No. 16/988,408, filed Aug. 7, 2020, entitled Generating Refined Segmentation Masks Based On Uncertain Pixels.
U.S. Appl. No. 17/200,525, filed Mar. 12, 2021, entitled Generating Refined Segmentation Masks Via Meticulous Object Segmentation.
Combined Search and Examination Report as received in UK application GB2211587.7 dated Feb. 17, 2023.

* cited by examiner

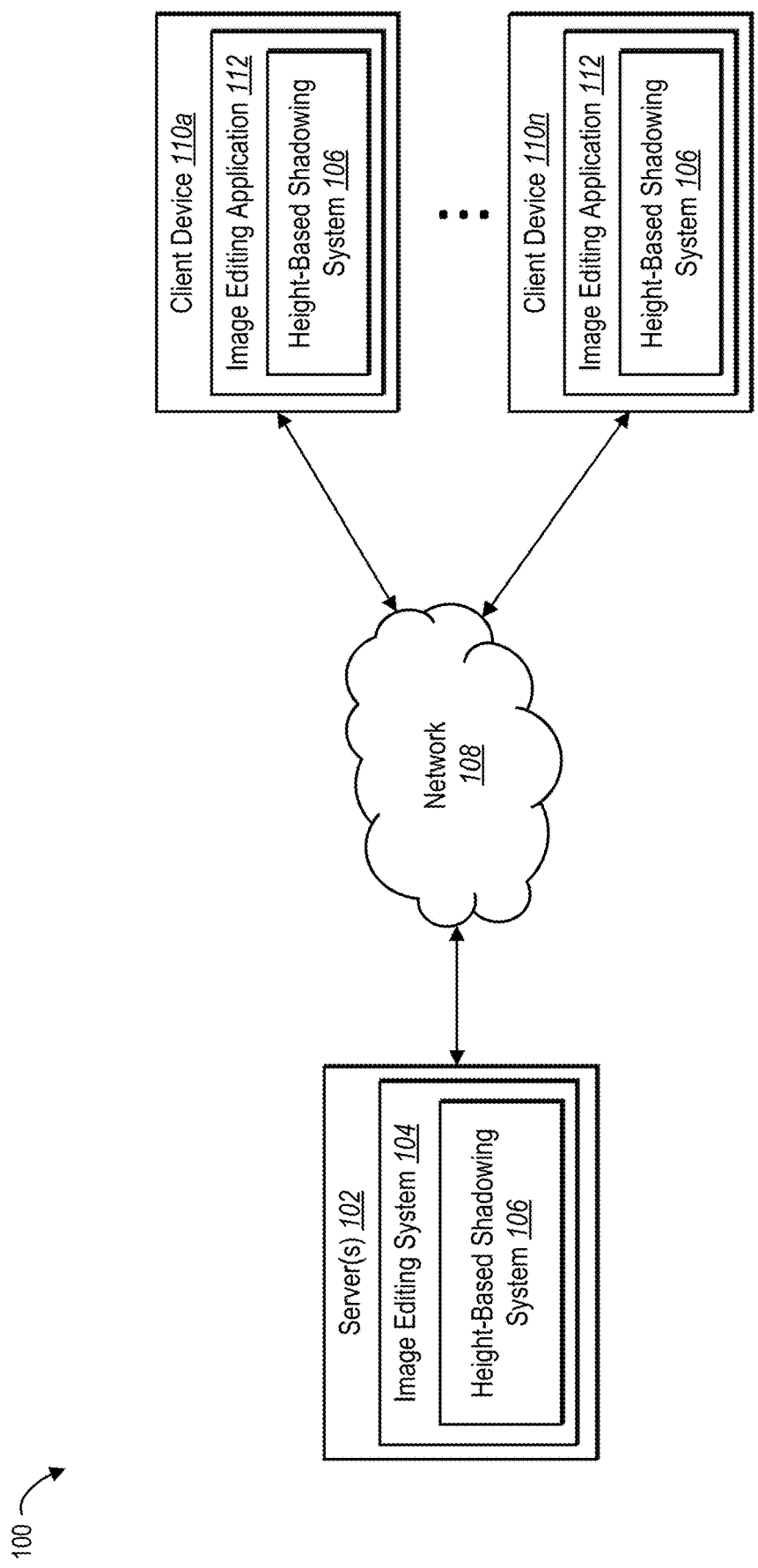

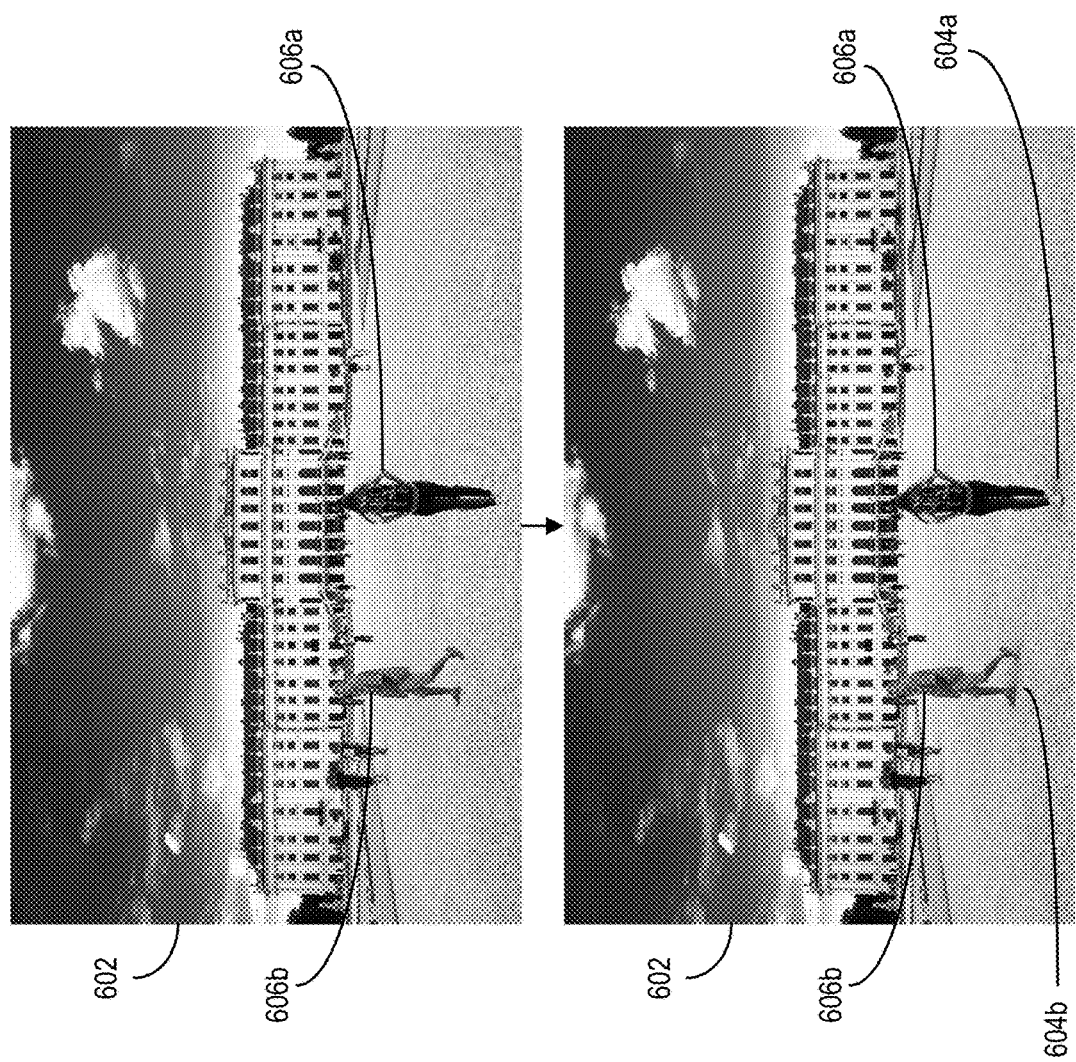

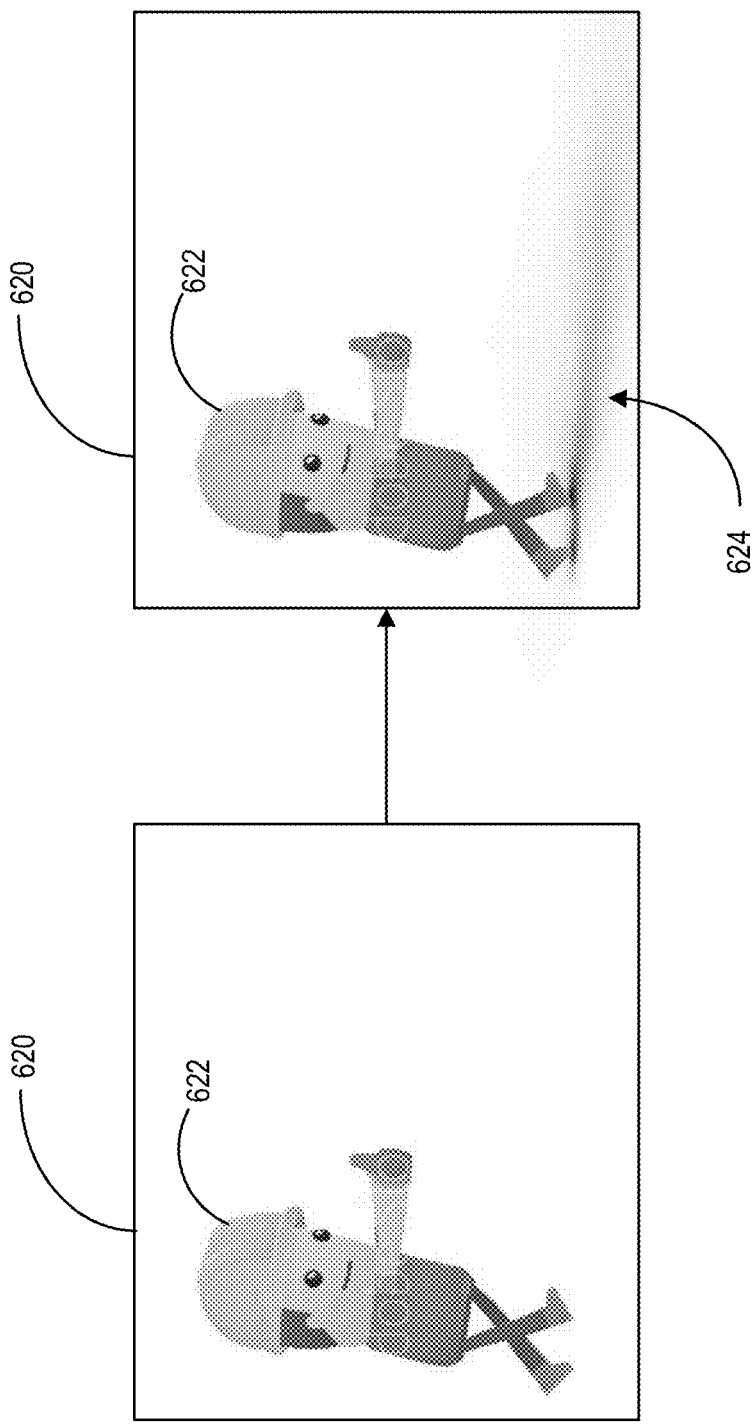

GENERATING SHADOWS FOR DIGITAL OBJECTS WITHIN DIGITAL IMAGES UTILIZING A HEIGHT MAP

BACKGROUND

Recent years have seen significant advancement in hardware and software platforms for editing digital images. In particular, many conventional systems implement various techniques that improve the aesthetic of a digital image, such as by increasing the realism portrayed by the digital image. To illustrate, some conventional systems offer tools for creating a shadow to portray the appearance of an object (e.g., a person) depicted within a digital image under certain lighting conditions. Indeed, these systems create shadows where shadows are initially absent (e.g., within composite digital images where an object is artificially inserted into a background image) to portray objects more realistically in digital images.

Despite these advances, however, conventional image shadowing systems suffer from several technological shortcomings that result in inflexible, inaccurate, and inefficient operations. For instance, many conventional systems rely on using a three-dimensional model of an object portrayed in a two-dimensional image to generate a shadow for the object. In particular, these conventional systems often employ a physics-based shadow rendering algorithm to generate a shadow using a three-dimensional model of the object. Accordingly, such systems fail to produce shadows for objects where a corresponding three-dimensional model is unavailable. Some systems address this issue using neural-network-based image synthesis to create shadows. These systems, however, lack features for controlling the characteristics of the resulting shadow (e.g., direction, perspective, softness).

In addition to the flexibility problems described above, conventional image shadowing systems often fail to generate shadows that accurately portray the shadows of objects under realistic lighting conditions. For instance, the three-dimensional models employed by many conventional systems are typically erroneous, and the physics-based shadow rendering algorithms are often sensitive to these errors. Accordingly, the shadows produced by such models tend to include various artifacts—especially in the ground contact area as the three-dimensional models typically fail to make full contact with the ground. Though conventional systems utilizing neural-network-based image synthesis avoid use of three-dimensional models, the neural networks that are employed often have limited generalization capabilities due to a failure to explicitly model the object geometry and relevant lighting. Indeed, such systems often utilize the employed neural networks to learn mappings between light information and generated shadows without geometry constraints. Accordingly, these systems also tend to produce unrealistic shadows.

Further, conventional image shadowing systems suffer from inefficiencies. For instance, the physics-based shadow rendering algorithms employed by many conventional systems typically require a significant amount of computing resources (e.g., memory and computer processing) to generate the resulting shadow. Additionally, these systems often require various user adjustments to align the three-dimensional model upon which the shadow is based with the corresponding object depicted in the image, which can be difficult and time consuming. Thus, these systems typically require a significant amount of user interactions to produce a shadow that is aligned with the object.

These, along with additional problems and issues, exist with regard to conventional image shadowing systems.

SUMMARY

One or more embodiments described herein provide benefits and/or solve one or more problems in the art with systems, methods, and non-transitory computer-readable media that generate shadows for objects portrayed in digital images utilizing flexible height maps corresponding to the objects. For example, in one or more embodiments, a system generates a height map for an object portrayed in a two-dimensional digital image. In some cases, the height map indicates heights of the pixels of the object within the image projection space of the digital image. The system generates a shadow for the object utilizing the height map by, for example, determining how a shadow of the object projects onto a surface portrayed in the digital image based on certain lighting conditions. In some embodiments, the system provides the digital image having the shadow within a graphical user interface. The system further modifies the shadow based on one or more user interactions with the digital image detected via the graphical user interface. In this manner, the system generates accurate shadows for objects withing digital images while providing flexible controls for modifying the characteristics of those shadows.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 1 illustrates an example environment in which a height-based shadowing system operates in accordance with one or more embodiments;

FIGS. 6A-6C each illustrate modifying a digital image to include an object shadow for a digital object displayed therein in accordance with one or more embodiments;

DETAILED DESCRIPTION

Figure 2A:
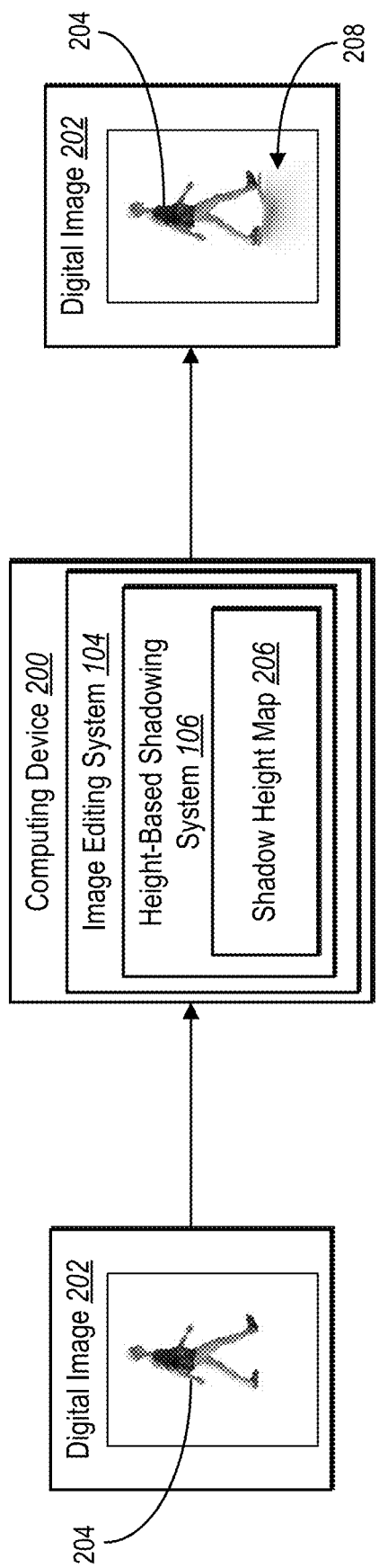
FIGS. 2A-2B illustrates overview diagrams of the height-based shadowing system modifying a digital image to include an object shadow for a digital object portrayed therein in accordance with one or more embodiments.

One or more embodiments described herein include a height-based shadowing system for flexibly generating a shadow for an object within a digital image by utilizing a height map of the object to accurately determine the projection of the shadow. Indeed, in one or more embodiments, the height-based shadowing system generates, for an object portrayed in a two-dimensional digital image, a height map that indicates the height of the pixels of the object with respect to a plane portrayed in the digital image (e.g., with respect to the ground). The height-based shadowing system utilizes the height map, along with the position of the light source for the digital image, to drop a shadow in two-dimensional space based on the projection of three-dimensional geometry constraints. In other words, the height-based shadowing system determines how a shadow for the object projects across the digital image and generates a shadow for the object using the determined projections.

To provide an illustration, in one or more embodiments, the height-based shadowing system extracts, from a digital image portraying a digital object, an object mask corresponding to the digital object. Further, the height-based shadowing system generates a height map from the object mask corresponding to the digital object, the height map comprising pixel heights for pixels of the digital object utilizing a height prediction neural network. Using the pixel heights from the height map and light source information for the digital image, the height-based shadowing system determines shadow projections for the pixels of the digital object. Further, the height-based shadowing system modifies the digital image to include an object shadow for the digital object using the shadow projections for the pixels of the digital object.

As just mentioned above, in one or more embodiments, the height-based shadowing system generates a height map for a digital object portrayed within a digital image. In particular, the height-based shadowing system generates a height map that indicates, for the pixels of the digital object, pixels heights within an image space. To illustrate, in one or more embodiments, the height-based shadowing system extracts an object mask for the digital object and utilizes the object mask to generate the height map. In some cases, the height-based shadowing system further determines an object cutout for the digital object and a coordinate scheme that corresponds to the digital image. Accordingly, the height-based shadowing system generates the height map height further utilizing the object cutout and the coordinate scheme.

In some implementations, the height-based shadowing system utilizes a height prediction neural network to generate the height map. In some cases, the height-based shadowing system generates the height prediction neural network using synthetic training images and/or real training images. Accordingly, in some cases, the height-based shadowing system utilizes the height prediction neural network to generate a height map for the digital object based on the object mask, the object cutout, and/or the coordinate scheme.

As further indicated above, in one or more embodiments, the height-based shadowing system determines a shadow projection for the digital object using the height map. In particular, in some cases, the height-based shadowing system determines shadow projections for the pixels of the digital object using the pixels heights provided by the height map. In one or more embodiments, the height-based shadowing system determines a shadow projection for a pixel of the digital object by determining a position of a corresponding shadow pixel within the digital image utilizing a corresponding pixel height from the height map.

In some embodiments, the height-based shadowing system further utilizes light source information associated with the digital image to determine the shadow projections. Indeed, in some instances, the height-based shadowing system determines the shadow projections using the position of the light source for the digital image. In some cases, the height-based shadowing system further utilizes the position of a horizon associated with the digital image or a projection of the light source onto the horizon.

Furthermore, the height-based shadowing system allows for customization of the shadow. For example, in some implementations, the height-based shadowing system generates a hard shadow mask using the determined projections and further generates a soft shadow for the digital object from the hard shadow mask. In some cases, the height-based shadowing system modifies one or more characteristics of the generated shadow (e.g., the softness or direction of the shadow) in response to detecting user interactions with a graphical user interface displaying the digital image.

More particularly, as indicated above, in one or more implementations, the height-based shadowing system generates an object shadow for the digital object using the shadow projections (e.g., using the shadow pixels determined via the shadow projections). To illustrate, in some implementations, the height-based shadowing system generates a hard shadow mask for the digital object using the shadow projections. Further, the height-based shadowing system generates a soft object shadow from the hard shadow mask. In some cases, the height-based shadowing system further utilizes the object mask to generate the soft object shadow. Further, in some embodiments, the height-based shadowing system generates the soft object shadow based on a softness value (e.g., a value that indicates the degree of softness to provide the soft object shadow). In some implementations, the height-based shadowing system utilizes a shadow stylization neural network to generate the soft object shadow from the hard shadow mask, the object mask, and/or the softness value.

In some embodiments, the height-based shadowing system modifies the digital image to include the object shadow for the digital object. In particular, the height-based shadowing system modifies the digital image so that the digital object appears to cast a shadow (e.g., the object shadow) across one or more surfaces depicted in the digital image. In some cases, the height-based shadowing system provides the digital image with the object shadow for display within a graphical user interface of a client device. In some instances, the height-based shadowing system detects one or more user interactions via the graphical user interface. For instance, in some embodiments, the height-based shadowing system detects a user interaction with the digital object, with the object shadow, or otherwise with the digital image (e.g., either directly or via one or more controls provided via the graphical user interface). Based on the detected user interaction(s), the height-based shadowing system modifies one or more attributes of the object shadow within the digital image in some cases. For instance, in some implementations, the height-based shadowing system modifies a position of the object shadow, a direction of the object shadow or a softness of the object shadow.

In some cases, the height-based shadowing system generates object shadows for digital objects that do not contact the ground. Similarly, in one or more embodiments, the height-based shadowing system can modify the object shadow of a digital object in response to determining that the digital object has been moved vertically within the digital image. For instance, in some implementations, the height-based shadowing system determines the amount of vertical shift of the digital object and adds a corresponding shift value to the height map for the digital object. In particular, the height-based shadowing system adds the shift value to the pixel heights included in the height map.

Further, in some embodiments, the height-based shadowing system provides decorative shadows for digital image assets—such as images of products to be displayed on an e-commerce site—by generating object shadows. For instance, in some cases, the height-based shadowing system runs a batch process to generate object shadows for a plurality of digital images. In some cases, the height-based shadowing system implements utilizes common light source information for each digital image in the batch so that the digital objects depicted therein appear to be captured under consistent lighting conditions.

The height-based shadowing system provides several advantages over conventional systems. For instance, the height-based shadowing system operates more flexibly than conventional systems. For example, by generating object shadows for digital objects using height maps, the height-based shadowing system flexibly generates object shadows without relying on three-dimensional models of those digital objects. Further, by modifying an object shadow in response to user interactions detected via a graphical user interface, the height-based shadowing system maintains flexible control over the attributes of the object shadow.

Further, the height-based shadowing system generates more accurate object shadows when compared to conventional systems. In particular, the height-based shadowing system generates object shadows that more accurately portray the shadow of an object under certain lighting conditions within a digital image. For instance, by generating object shadows using height maps for digital objects rather than error-prone three-dimensional models, the height-based shadowing system reduces the artifacts present in the resulting object shadows. Further, by using height maps and corresponding light source information, the height-based shadowing system improves upon the modeling of the object geometry and lighting to create more realistic object shadows.

Additionally, the height-based shadowing system operates with improved efficiency. Indeed, the height-based shadowing system reduces the consumption of computing resources required to generate object shadows when compared, for example, to conventional systems that employ a physics-based shadow rendering algorithm to create a shadow from a three-dimensional model of an object. Further, the height-based shadowing system generates object shadows with reduced user interaction. In particular, by generating and using a height map corresponding to a digital object, the height-based shadowing system avoids the need for user interactions to adjust a three-dimensional model to correctly align the model with the digital object. Accordingly, the height-based shadowing system reduces the user interactions, time, and computing resources required for generating an object shadow with a desired (e.g., realistic) visual appearance.

As illustrated by the foregoing discussion, the present disclosure utilizes a variety of terms to describe features and benefits of the segmentation refinement system. Additional detail is now provided regarding the meaning of these terms. For example, as used herein, the term "digital image" refers to a digital visual representation (e.g., an image composed of digital data). In particular, in some embodiments, a digital image refers to a digital file that is made of digital image data and is displayable via a user interface. For example, in some implementations a digital image includes a digital photo, a digital rendering (e.g., a scan or other digital reproduction) of a photograph or other document, or a frame of a digital video or other animated sequence. In some implementations, a digital image includes a digitally generated drawing, chart, map, graph, logo, or other graphic. Relatedly, as used herein, the term "image space" refers to a space defined by a digital image. In particular, in some embodiments, an image space refers to a space defined by the pixels of a digital image. For example, in some embodiments, the height-based shadow system determines the distance between two points of a digital image in its corresponding image space as the distance in pixels.

Additionally, as used herein, the term "digital object" refers to an item or object portrayed in a digital image. In particular, in one or more embodiments, a digital object refers to an organic or non-organic object depicted in a digital image. To illustrate, in some embodiments, a digital object includes, but is not limited to, a person, an animal, a building, a plant, a vehicle, a chair, or a handheld item.

Further, as used herein, the term "pixel" refers to an element of a digital image. In particular, in some embodiments, a pixel includes a smallest unit of a digital image that is displayable or otherwise representable (e.g., within a graphical user interface). To illustrate, in some implementations, a pixel includes an element of a digital image that is associated with one or more particular characteristics of a digital image. For instance, in some cases, a pixel includes an element of a digital image that portrays or contributes to the portrayal of a digital object depicted in the digital image.

As used herein, the term "pixel height" refers to a height of an object in a digital image based on pixels of the digital image. In particular, in some embodiments, a pixel height refers to a value or measurement that indicates a vertical distance of a pixel of a digital image from another point, such as another pixel of the digital image. To illustrate, in some implementations, a pixel height includes a measurement indicating the vertical distance of a pixel within a digital image with respect to a ground surface associated with (e.g., portrayed in) the digital image measured in pixels.

Further, as used herein, the term "object shadow" refers to a shadow associated with a digital object. In particular, in one or more embodiments, an object shadow refers to a shadow that is cast by a digital object portrayed in a digital image based on lighting conditions that are associated with the digital image. For example, in some cases, an object shadow includes a shadow that is cast from a digital object across one or more surfaces portrayed in the corresponding digital image. In some implementations, an object shadow includes a hard object shadow or a soft object shadow. As used herein, the term "hard object shadow" refers to an object shadow having hard boundaries. In particular, in some embodiments, a hard object shadow refers to an object shadow having boundaries that are clearly defined. For example, in some cases, a clear distinction exists between every portion (e.g., every edge) of a hard object shadow and the surrounding area. In contrast, as used herein, the term "soft object shadow" refers to an object shadow having one or more soft boundaries. In particular, in some embodiments, a soft object shadow refers to an object shadow having one or more boundaries that are not clearly defined (e.g., blend into the surrounding area). For instance, in some cases, a soft object shadow includes an object shadow having at least a portion that appears to gradually fade into the surrounding area.

As used herein the term "softness" refers to a characteristic or attribute that distinguishes between hard object shadows and soft object shadows. In particular, in some embodiments, softness refers to a characteristic of having one or more soft boundaries. Further, in some cases, softness is associated with a degree. In other words, in some implementations, soft object shadows can have different degrees or levels of softness, where a higher level of softness is associated with a stronger blending of a soft object shadow with the surrounding area. As used herein, the term "softness value" refers to a value or set of values (e.g., a vector of values) that quantifies the softness of an object shadow, such as a soft object shadow. In some cases, a baseline softness value (e.g., a softness value of zero) is associated with a hard shadow object, a softness value above the baseline softness value is associated with a soft object shadow, and a relatively higher softness value is associated with a higher degree of softness for a soft object shadow. In some cases, the height-based shadowing system generates a soft object shadow having a certain degree of softness based on a softness value. Relatedly, as used herein, the term "softness control" refers to a feature for determining or modifying a softness value. In particular, in some embodiments, a softness control refers to a graphical user interface element that indicates a softness value used to generate object shadows and is interactable for modifying the softness value.

As used herein, the term "shadow projection" refers to a projection of a shadow from one portion of a digital image onto another portion of a digital image based on lighting conditions associated with the digital image. For instance, in some cases, a shadow projection refers to a shadow (i.e., an object shadow) cast across one or more surfaces of a digital image by a digital object portrayed in the digital image due to associated lighting conditions. In some cases, a shadow projection includes a location of the object shadow corresponding to a digital object (e.g., the locations for its individual shadow pixels). In some cases, a shadow projection includes one or more other qualities of an object shadow, such as its orientation, size, boundaries, etc. In some instances, the height-based shadowing system determines these other qualities based on the locations of the individual shadow pixels.

As used herein, the term "shadow pixel" refers to a pixel of a digital image associated with an object shadow. In particular, in some embodiments, a shadow pixel refers to a pixel that portrays or contributes to the portrayal of an object shadow. As will be discussed below, in one or more embodiments, the height-based shadowing system identifies, generates, or otherwise determines shadow pixels of an object shadow from a shadow projection of a corresponding digital object (e.g., from the shadow projections of the pixels of the digital object).

Additionally, as used herein, the term "height map" refers to a map of pixels to their corresponding pixel heights. In particular, in some embodiments, a height map includes a map indicating the pixels heights of pixels associated with one or more digital objects portrayed in a digital image. For instance, in some cases, a height map includes a one channel map having a single value for each pixel of a digital object that indicates the pixel height of that pixel. In one or more implementations, the height map indicates pixel heights of pixels of an object from a horizon line, ground level, or other point of reference in the digital image.

As used herein, the term "neural network" refers to a type of machine learning model, which can be tuned (e.g., trained) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

Additionally, as used herein, the term "height prediction neural network" refers to a computer-implemented neural network that generates height maps for digital images. Indeed, in some embodiments, a height prediction neural network refers to a neural network that analyzes a digital image and generates a height map for the digital image. In particular, in some cases, the height prediction neural network analyzes one or more digital objects portrayed in a digital image and generates a height map (or multiple height maps) for the one or more digital objects. In some cases, the height prediction neural network analyzes the digital image (e.g., the one or more digital objects) by analyzing one or more object masks, object cutouts, and/or one or more coordinate schemes associated with the digital image.

Further, as used herein, the term "shadow stylization neural network" refers to a computer-implemented neural network that generates soft object shadows for digital objects portrayed in a digital image. In particular, in some embodiments, a shadow stylization neural network refers to a neural network that generates soft object shadows based on shadow projections determined for a digital object. For instance, in some cases, a shadow stylization neural network includes a neural network that analyzes a hard shadow mask and an object mask for a digital object and generates a soft object shadow for the digital object based on the analysis.

As used herein, the term "mask" refers to a map useful for partitioning a digital image into separate portions. In particular, in some cases, a mask refers a map that corresponds to a digital image and identifies a set of pixels of the digital image belonging to one portion of the digital image and another set of pixels belonging to another portion of the digital image. For example, in some embodiments, a mask includes a map of a digital image that has an indication for each pixel of whether the pixel corresponds to a particular portion of the digital image or not. In some implementations, the indication includes a binary indication (a 1 for pixels belonging to the portion and a zero for pixels not belonging to the portion). In alternative implementations, the indication includes a probability (e.g., a number between 1 and 0) that indicates the likelihood that a pixel belongs to a particular portion. In such implementations, the closer the value is to 1, the more likely the pixel belongs to the portion and vice versa. As used herein, the term "object mask" refers to a mask that distinguishes between one or more objects of a digital image from other portions of the digital image. Further, as used herein, the term "hard shadow mask" refers to a mask that distinguishes between a hard object shadow for a digital object from other portions of the digital image.

Additionally, as used herein, the term "light source information" refers to information related to lighting conditions associated with a digital image. In particular, in some embodiments, light source information refers to information that indicates how a light source associated with a digital image affects one or more shadow projections determined for one or more digital objects portrayed in the digital image. For instance, in some cases, light source information includes the position of a light source for a digital image. In some embodiments, light source information includes a position of a horizon associated with the digital image. In particular, in some cases, light source information includes a position of a light source with respect to a horizon or a projection of the light source onto the horizon.

As used herein, the term "object cutout" refers to an isolated portrayal of a digital object from a digital image. In particular, in some embodiments, an object cutout refers to an extraction or replication of a digital object from a digital object that portrays the digital object in the color palette in which the digital image portrays the digital object (e.g., the RGB color palette of the digital image). In some cases, an object cutout includes an image that portrays the digital object against a background that is different than the background of the corresponding digital image, such as a solid white, gray, or black background. Indeed, in some implementations, an object cutout includes an image that portrays the foreground of a digital image. In some cases, an object cutout maintains the two-dimensional representation of a digital object from a two-dimensional digital image.

Additionally, as used herein, the term "coordinate scheme" refers to a standard of coordinate points associated with a digital image. In particular, in some embodiments, a coordinate scheme refers to a map of pixels of a digital image to coordinate points. In one or more embodiments, a coordinate scheme establishes ana origin point at one of the corners of the digital image, at a center of the digital image, or at another portion of the digital image. In some cases, a coordinate scheme includes a two-dimensional coordinate scheme that is associated with a two-dimensional digital image. In some implementations, a coordinate scheme includes an indication of a y-axis to associated with a digital image (e.g., orientation of the y-axis and/or direction of increasing/decreasing value for the y-axis).

Additional detail regarding the height-based shadowing system will now be provided with reference to the figures. For example, FIG. 1 illustrates a schematic diagram of an exemplary system 100 in which a height-based shadowing system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the height-based shadowing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 10). Moreover, the server(s) 102 and the client devices 110a-110n include one of a variety of computing devices (including one or more computing devices as discussed in greater detail with relation to FIG. 10).

As mentioned above, the system 100 includes the server(s) 102. In one or more embodiments, the server(s) 102 generates, stores, receives, and/or transmits data, including digital images and modified digital images (e.g., digital images modified to include object shadows for digital objects portrayed in the digital images). For example, in some embodiments, the server(s) 102 receives a digital image from a client device (e.g., one of the client devices 110a-110n) and transmits a modified digital image to the client device in return. In one or more embodiments, the server(s) 102 comprises a data server. In some implementations, the server(s) 102 comprises a communication server or a web-hosting server.

As shown in FIG. 1, the server(s) 102 includes an image editing system 104. In one or more embodiments, the image editing system 104 provides functionality by which a client device (e.g., one of the client devices 110a-110n) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image.

Additionally, the server(s) 102 includes the height-based shadowing system 106. In particular, in one or more embodiments, the height-based shadowing system 106 utilizes the server(s) 102 to modify digital images to include object shadows for digital objects portrayed in the digital images. For example, in some cases, the height-based shadowing system 106 utilizes the server(s) 102 to receive a digital image that portrays a digital object and modify the digital image to include an object shadow for the digital object.

To illustrate, in one or more embodiments, the height-based shadowing system 106, via the server(s) 102, extracts an object mask for a digital object from a digital image portraying the digital object. Further, via the server(s) 102, the height-based shadowing system 106 utilizes a height prediction neural network to generate a height map from the object mask corresponding to the digital object, the height map comprising pixel heights for pixels of the digital object. Additionally, via the server(s) 102, the height-based shadowing system 106 determines shadow projections for the pixels of the digital object using the pixel heights from the height map and light source information for the digital image. Via the server(s) 102, the height-based shadowing system 106 also modifies the digital image to include an object shadow for the digital object using the shadow projections for the pixels of the digital object.

In one or more embodiments, the client devices 110a-110n include computing devices that display and/or modify digital images. For example, the client devices 110a-110n include one or more of smartphones, tablets, desktop computers, laptop computers, head-mounted-display devices, and/or other electronic devices. In some instances, the client devices 110a-110n include one or more applications (e.g., the image editing application 112) that allow for display and/or modification of digital images. For example, in one or more embodiments, the image editing application 112 includes a software application installed on the client devices 110a-110n. Additionally, or alternatively, the image editing application 112 includes a software application hosted on the server(s) 102 (and supported by the image editing system 104), which is accessible by the client devices 110a-110n through another application, such as a web browser.

In particular, in some implementations, the height-based shadowing system 106 on the server(s) 102 supports the height-based shadowing system 106 on the client device 110n. For instance, the height-based shadowing system 106 on the server(s) 102 learns parameters for the height prediction neural network and/or a shadow stylization neural network. The height-based shadowing system 106 then, via the server(s) 102, provides the height prediction neural network and/or the shadow stylization neural network to the client device 110n. In other words, the client device 110n obtains (e.g., downloads) the height prediction neural network and/or the shadow stylization neural network with the learned parameters from the server(s) 102. Once downloaded, the height-based shadowing system 106 on the client device 110n is able to utilize the height prediction neural network and/or the shadow stylization neural network to generate object shadows for digital objects portrayed in digital images independent from the server(s) 102.

In alternative implementations, the height-based shadowing system 106 includes a web hosting application that allows the client device 110n to interact with content and services hosted on the server(s) 102. To illustrate, in one or more implementations, the client device 110n accesses a web page supported by the server(s) 102. The client device 110n provides a digital image to the server(s) 102, and, in response, the height-based shadowing system 106 on the server(s) 102 modifies the digital image to include an object shadow for a digital object portrayed in the digital image. The server(s) 102 then provides the modified digital image to the client device 110n for display or further editing.

Indeed, the height-based shadowing system 106 is able to be implemented in whole, or in part, by the individual elements of the system 100. Indeed, although FIG. 1 illustrates the height-based shadowing system 106 implemented with regard to the server(s) 102, different components of the height-based shadowing system 106 can be implemented by a variety of devices within the system 100. For example, in one or more implementations, one or more (or all) components of the height-based shadowing system 106 are implemented by a different computing device (e.g., one of the client devices 110a-110n) or a separate server from the server(s) 102 hosting the image editing system 104. Indeed, as shown in FIG. 1, the client devices 110a-110n include the height-based shadowing system 106. Example components of the height-based shadowing system 106 will be described below with regard to FIG. 8.

Figure 2B:
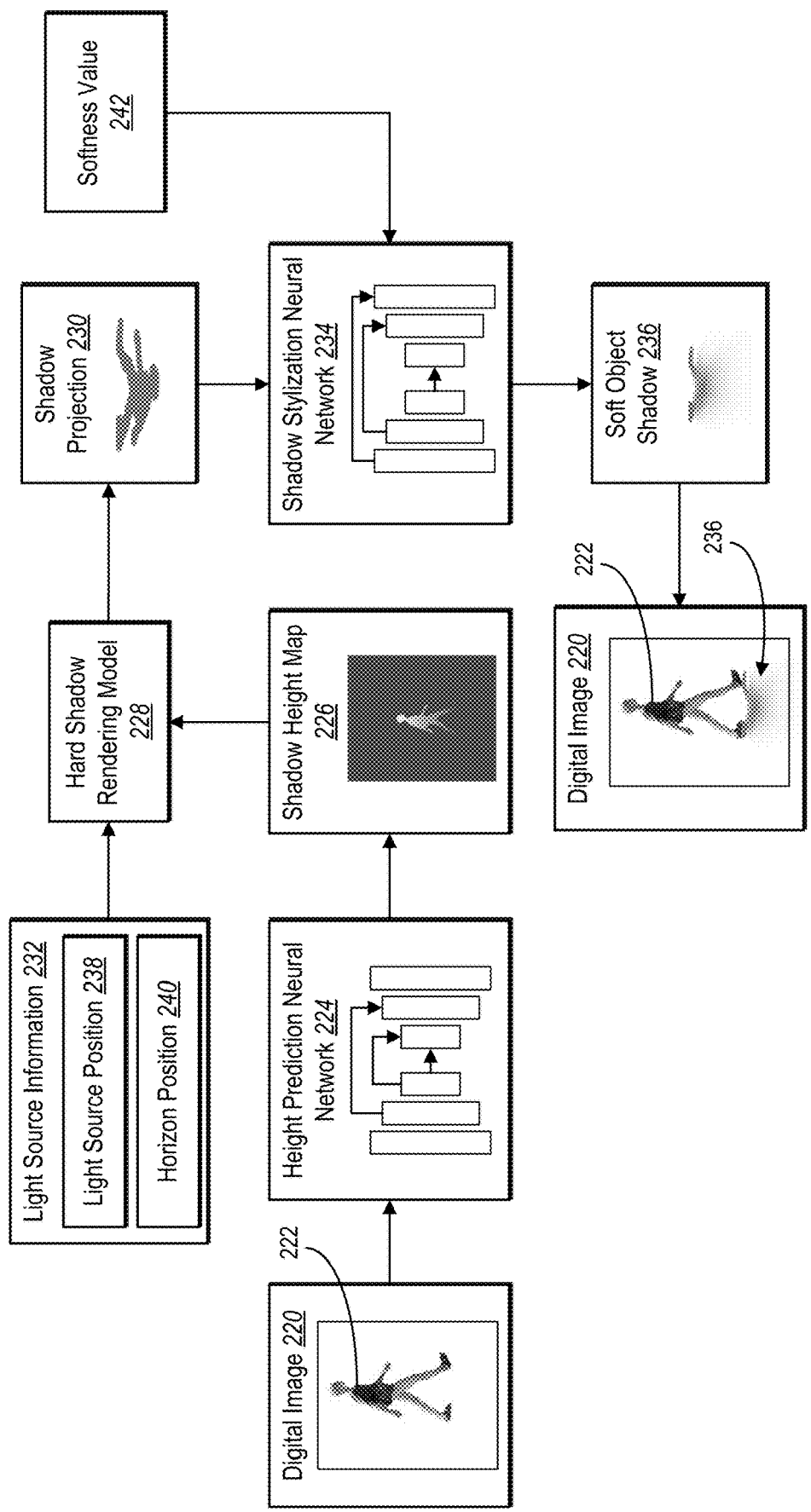

As mentioned above, in one or more embodiments, the height-based shadowing system 106 modifies a digital image to include an object shadow for a digital object portrayed in the digital image. FIGS. 2A-2B illustrate overview diagrams of the height-based shadowing system 106 modifying a digital image to include an object shadow in accordance with one or more embodiments.

Indeed, as shown in FIG. 2A, the height-based shadowing system 106 determines (e.g., identifies or otherwise obtains) a digital image 202. In one or more embodiments, the height-based shadowing system 106 obtains the digital image 202 by receiving the digital image 202 from a computing device (e.g., a server hosting a third-party system or a client device). In some embodiments, however, the height-based shadowing system 106 determines the digital image 202 by accessing a database storing digital images. For example, in at least one implementation, the height-based shadowing system 106 maintains a database and stores a plurality of digital images therein. In some instances, an external device or system stores digital images for access by the height-based shadowing system 106.

In some embodiments, the height-based shadowing system 106 receives the digital image 202 by receiving an indication of the digital image 202. For instance, in some cases, the height-based shadowing system 106 receives a storage location of the digital image 202, a file name of the digital image 202, or a selection of the digital image 202. Accordingly, the height-based shadowing system 106 retrieves the digital image 202 based on the received indication. To illustrate, as shown in FIG. 2A, in some instances, the height-based shadowing system 106 operates on a computing device 200 (e.g., the server(s) 102 or one of the client devices 110a-110n discussed above with reference to FIG. 1 or some other mobile computing device, such as a smart phone or tablet). Accordingly, in some embodiments, the height-based shadowing system 106 retrieves the digital image 202 by accessing the digital image 202 from local storage or from a remote storage location that is accessible to the computing device 200.

As illustrated in FIG. 2A, the digital image 202 portrays a digital object 204 (e.g., a person). Further, as shown, the digital image 202 does not include an object shadow for the digital object 204. In one or more embodiments, the lack of an object shadow is due to the nature of the digital image 202. For instance, in some cases, the digital object 204 was edited into the digital image 202 (e.g., via an image composition process or other editing process); therefore, the digital object 204 does not appear under the lighting conditions originally associated with the digital image 202 when captured. In some cases, the digital image 202 is composed of elements (including the digital object 204) manually edited together from various pre-configured image elements; therefore, the digital image 202 was created without lighting conditions at all.

As further shown in FIG. 2A, the height-based shadowing system 106 modifies the digital image 202 to include an object shadow 208 for the digital object 204. In particular, in some implementations, the height-based shadowing system 106 generates the object shadow 208 based on an analysis of the digital image 202 (e.g., an analysis of the digital object 204). Accordingly, the height-based shadowing system 106 modifies the digital image 202 by inserting the object shadow 208.

As shown, the height-based shadowing system 106 modifies the digital image 202 to include the object shadow 208 using a height map 206. For example, in one or more embodiments, the height-based shadowing system 106 generates the height map 206 for the digital object 204 and utilizes the height map 206 to generate the object shadow 208 for inclusion in the digital image 202. Generating and using height maps will be discussed in more detail below. In one or more embodiments, the height-based shadowing system 106 utilizes light source information associated with the digital image 202 along with the height map 206 to generate the object shadow 208 for the digital object 204.

As further illustrated, the object shadow 208 includes a soft object shadow corresponding to the digital object 204. In some embodiments, however, the height-based shadowing system 106 modifies the digital image 202 to include a hard object shadow or some other style of shadow for the digital object 204.

Further, while FIG. 2A illustrates generating a single object shadow for a single digital object portrayed in a digital image, the height-based shadowing system 106 generates an object shadow for each of multiple digital objects portrayed in a digital image in some implementations. Indeed, in some cases, the height-based shadowing system 106 generates a single height map that corresponds to multiple digital objects within a digital image or generates a height map for each digital object. Accordingly, the height-based shadowing system 106 generates object shadows for the multiple digital objects using the height map(s) and modifies the digital image to include the object shadows.

FIG. 2B illustrates an overview diagram of the height-based shadowing system 106 employing various models with a height map to generate a soft object shadow for a digital image in accordance with one or more embodiments. Indeed, as shown in FIG. 2B, the height-based shadowing system 106 utilizes a height prediction neural network 224 to generate a height map 226 for a digital image 220. In particular, the height prediction neural network 224 generates the height map 226 for a digital object 222 portrayed in the digital image 220 (e.g., indicating the pixels heights of the pixels of the digital object). In some cases, the height prediction neural network 224 generates the height map 226 by analyzing the digital image 220. For instance, in some embodiments, the height prediction neural network 224 analyzes various components that correspond to the digital image 220 (e.g., components that are either included in, derived from, or otherwise associated with the digital image 220) and generates the height map 226 based on the analysis.

As further shown in FIG. 2B, the height-based shadowing system 106 utilizes a hard shadow rendering model 228 to determine a shadow projection 230 for the digital object 222 portrayed in the digital image 220 using the height map 226. In particular, the height-based shadowing system 106 utilizes the hard shadow rendering model 228 to determine shadow projections for the pixels of the digital object 222 using the height map 226. As used herein, the term "hard shadow rendering model" refers to a computer-implemented model or algorithm that determines shadow projections of pixels within a two-dimensional space. In particular, in some embodiments, a hard shadow rendering model refers to a computer-implemented algorithm for determining, for a given pixel, a corresponding shadow projection. In some cases, the hard shadow rendering model determines a shadow projection of a pixel by determining a position of a corresponding shadow pixel.

Additionally, as shown in FIG. 2B, the height-based shadowing system 106 utilizes the hard shadow rendering model 228 to generate the shadow projection 230 further based on light source information 232 for the digital image 220. In one or more embodiments, the height-based shadowing system 106 determines the light source information 232 from user input. Indeed, in some cases, the height-based shadowing system 106 receives user input that provides the user input, such as the location of the light source or the location of the horizon. In some cases, the height-based shadowing system 106 determines the light source information 232 based on analyzing the digital image 220. For instance, the height-based shadowing system 106 analyzes the digital image 220 to detect a light source or determine the location of the light source based on one or more shadows already present within the digital image 220. As shown in FIG. 2B, and as will be explained in more detail below, the light source information includes the light source position 238 and the horizon position 240.

In one or more embodiments, upon determining the shadow projection 230, the height-based shadowing system 106 generates a hard shadow object for the digital object 222 portrayed in the digital image. For instance, using the locations of the shadow pixels identified via the shadow projection 230, the height-based shadowing system 106 generates the shadow pixels at those locations. In one or more embodiments, the height-based shadowing system 106 generates a shadow pixel as its location is identified via determination of the shadow projection 230. In some cases, the height-based shadowing system 106 determines the shadow projection 230 (e.g., the location for each shadow pixel) and then generates the shadow pixels at the corresponding locations.

As further illustrated by FIG. 2B, the height-based shadowing system 106 utilizes a shadow stylization neural network 234 to generate a soft object shadow 236 for the digital object 222 from the shadow projection 230 (e.g., from the hard shadow object generated from the shadow projection 230). As shown, the height-based shadowing system 106 provides a softness value 242 to the shadow stylization neural network 234, enabling control of the softness of the soft object shadow 236. Additionally, the height-based shadowing system 106 modifies the digital image 220 to include the soft object shadow 236 for the digital object 222.

By utilizing a height map to generate an object shadow for a digital object portrayed in a digital image, the height-based shadowing system 106 operates more flexibly than many conventional systems. Indeed, the height-based shadowing system 106 generates object shadows for digital objects without the use of three-dimensional models of those digital objects. Accordingly, the height-based shadowing system 106 flexibly generates object shadows for digital objects portrayed in a two-dimensional digital image where corresponding three-dimensional models are unavailable.

Figure 3A:
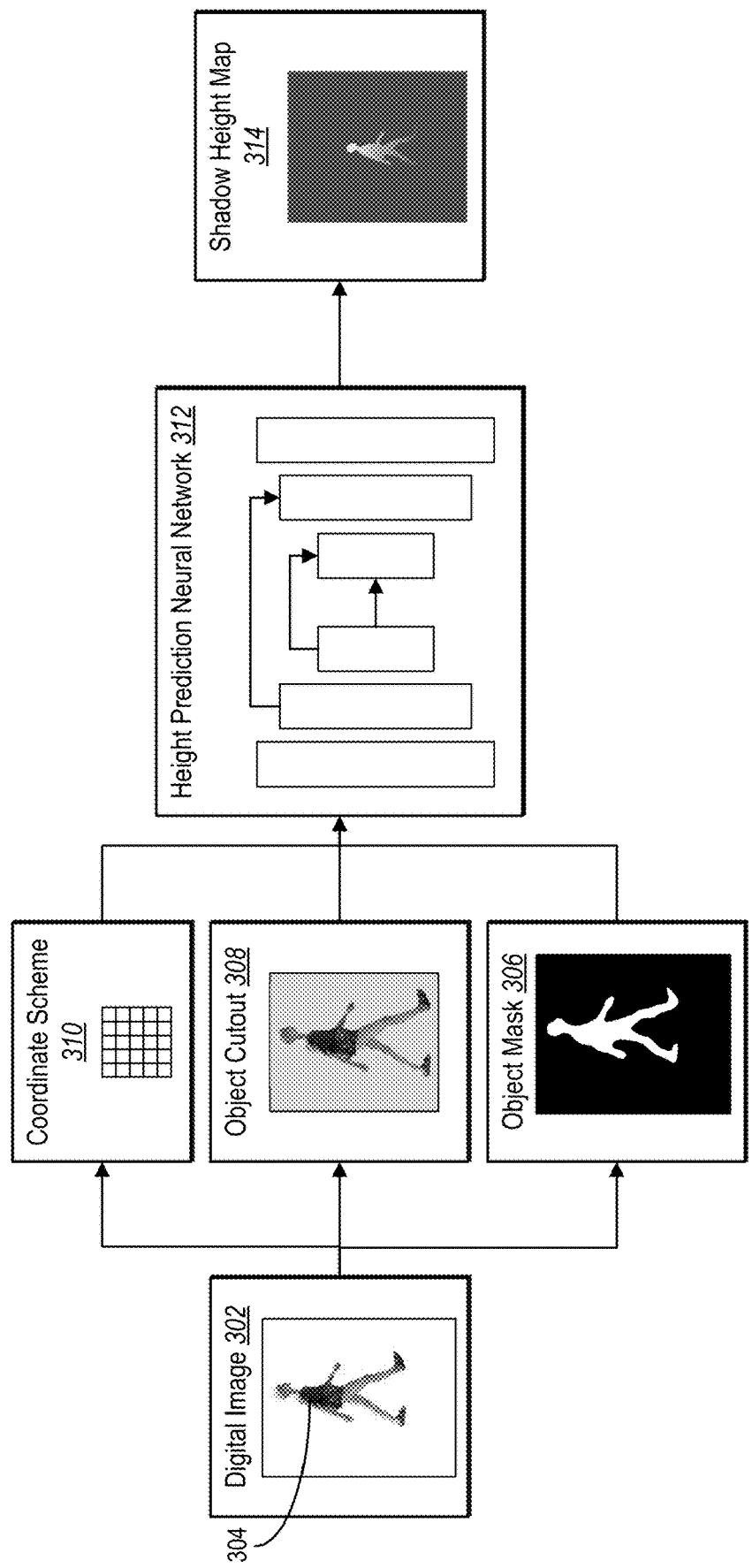
FIG. 3A illustrates a diagram for using a height prediction neural network to generate a height map for a digital object portrayed in a digital image in accordance with one or more embodiments.

As previously mentioned, in one or more embodiments, the height-based shadowing system 106 utilizes a height prediction neural network to generate a height map for a digital object portrayed in a digital image. FIG. 3A illustrates a diagram for using a height prediction neural network to generate a height map for a digital object portrayed in a digital image in accordance with one or more embodiments.

As shown in FIG. 3A, the height-based shadowing system 106 determines various components that correspond to a digital image 302 that portrays a digital object 304 for use in generating a height map 314 for the digital object 304. For instance, as illustrated in FIG. 3A, the height-based shadowing system 106 extracts an object mask 306 corresponding to the digital object 304 from the digital image 302. For example, in one or more embodiments, the height-based shadowing system 106 extracts the object mask 306 from the digital image 302 utilizing a segmentation model described in U.S. patent application Ser. No. 16/988,408 filed on Aug. 7, 2020, entitled GENERATING REFINED SEGMENTATION MASKS BASED ON UNCERTAIN PIXELS or the segmentation model described in U.S. patent application Ser. No. 17/200,525 filed on Mar. 12, 2021, entitled GENERATING REFINED SEGMENTATION MASKS VIA METICULOUS OBJECT SEGMENTATION, both of which are incorporated herein by reference in their entirety.

As further shown in FIG. 3A, the height-based shadowing system 106 determines an object cutout 308 for the digital object 304. In one or more embodiments, the height-based shadowing system 106 determines the object cutout 308 by applying the object mask 306 to the digital image 302. In some cases, the height-based shadowing system 106 receives the object cutout 308 via user input. For example, in at least one implementation, the height-based shadowing system 106 receives the object cutout 308 from a client device that extracts the object cutout 308 from the digital image 302 via user interactions with a snipping tool.

Additionally, as shown, the height-based shadowing system 106 determines a coordinate scheme 310 for the digital image 302. In some cases, the height-based shadowing system 106 utilizes, as the coordinate scheme 310, a default or pre-determined coordinate scheme. In some implementations, the height-based shadowing system 106 determines the coordinate scheme 310 based on user input (e.g., received from a client device) or pre-configured user preferences.

As illustrated by FIG. 3A, the height-based shadowing system 106 utilizes a height prediction neural network 312 to generate the height map 314. In one or more embodiments, the height prediction neural network 312 includes a neural network having an encoder-decoder neural network architecture. To illustrate, in some embodiments, the height prediction neural network 312 utilizes an encoder to encode the neural network inputs (e.g., the object mask 306, the object cutout 308, and the coordinate scheme 310) and utilizes the decoder to generate a neural network output (e.g., the height map 314) from the encoded inputs. In some implementations, the height prediction neural network 312 further includes one or more skip links with each skip link providing the output of at least one layer of the encoder to at least one layer of the decoder.

Figure 3B:
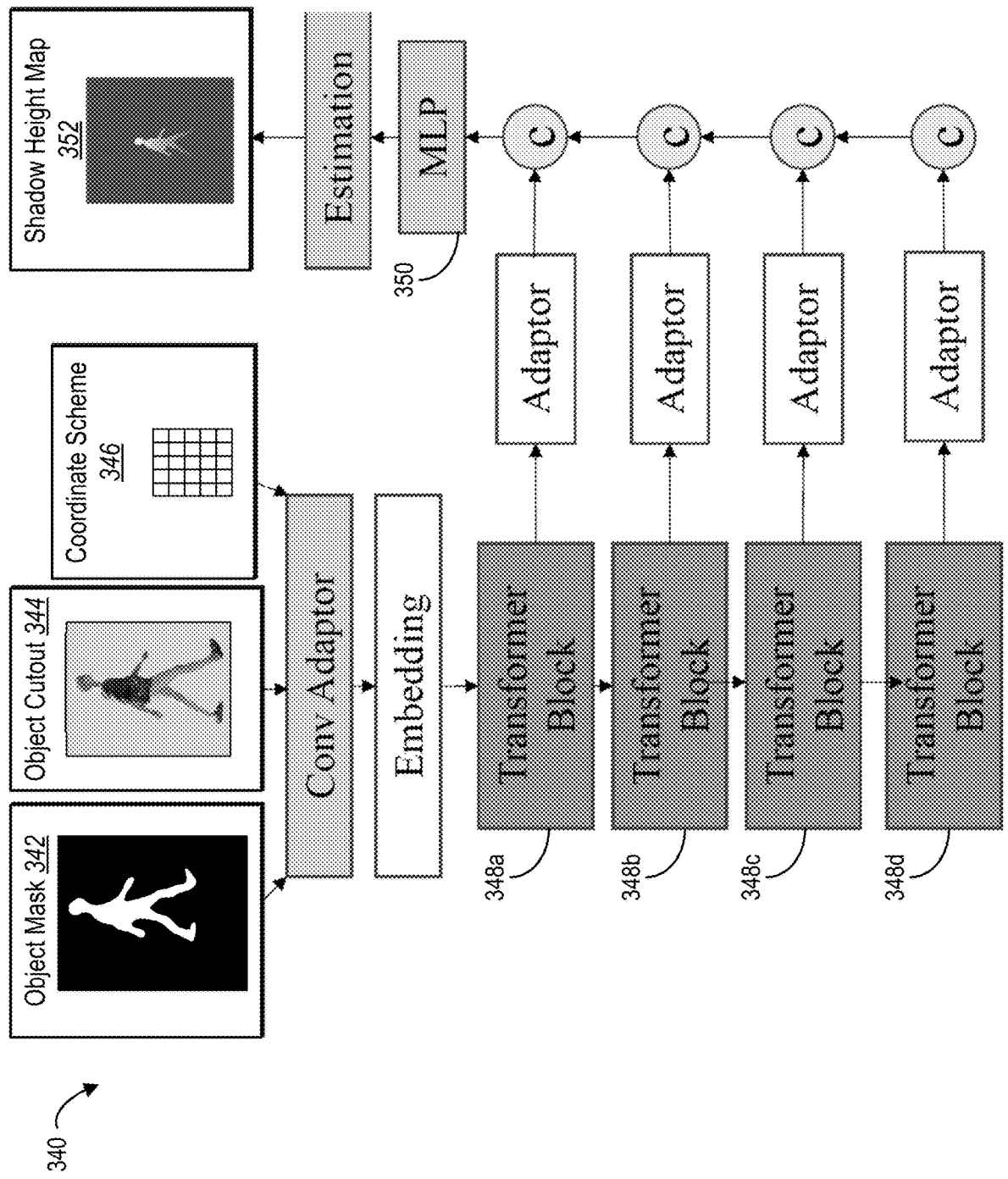
FIG. 3B illustrates an architecture of a height prediction neural network that generates height maps for digital objects portrayed in digital images in accordance with one or more embodiments.

FIG. 3B illustrates an architecture of a height prediction neural network 340 used by the height-based shadowing system 106 for generating height maps for digital objects portrayed in digital images in accordance with one or more embodiments. As previously mentioned, and as shown in FIG. 3B, the height-based shadowing system 106 provides an object mask 342, an object cutout 344, and a coordinate scheme 346 as input to the height prediction neural network 340. For instance, in some cases, the height-based shadowing system 106 combines (e.g., concatenates) the object mask 342, the object cutout 344, and the coordinate scheme 346 and provides the combination to the height prediction neural network 340. In some cases, the height-based shadowing system 106 normalizes the coordinate scheme 346 by setting the lowest point in the object mask 342 to be zero.

As shown in FIG. 3B, the height prediction neural network 340 includes a transformer backbone consisting of transformer blocks 348a-348d. Though a particular number of transformer blocks are shown, the height prediction neural network 340 can include various numbers of transformer blocks in other embodiments. The height prediction neural network 340 encodes the concatenation of the object mask 342, the object cutout 344, and the coordinate scheme 346 and generates or extracts features from the concatenation. More specifically, as shown, the height prediction neural network 340 generates features at different scales using the various transformer blocks. As used herein, the term "feature" refers to characteristics extracted from an input (e.g., image or concatenation of an image with other inputs) by a neural network. Features can comprise deep or latent features that are not readily comprehendible by a human or patent features that are visibly observable. A feature map is a collection of one or more features. In particular, a feature map can refer to a grid, a matrix, a vector, or a different multi-dimension collection of features. In addition, a feature map can include positions or places for individual feature values that make up a feature map. For example, a feature map can include feature values corresponding to pixels of a digital image such that the feature map represents the digital image in feature-value form.

As further shown in FIG. 3B, the height prediction neural network 340 includes a multi-level decoder 350. The height prediction neural network 340 utilizes the multi-level decoder to merge features from different scales. For example, in one or more implementations, each transformer block generates a feature map at a given scale (i.e., size). In one or more implementations, the feature maps are progressively small in scale and more abstract or latent. The adaptors rescale the feature maps to a common size to allow for concatenation. The concatenated feature maps are then decoded by the multi-level decoder 350 to generate the height map 352.

In one or more implementations, the use of the object mask 342 allows the height prediction neural network 340 to encode only the portion of the image including the object for which the height map is to be generated. In other words, the use of the object mask 342 allows the height prediction neural network 340 to efficiently generate the height map by ignoring other portions of the image.

Thus, the height-based shadowing system 106 generates a height map for a digital object portrayed in a digital image. In particular, in some embodiments, the height-based shadowing system 106 utilizes a height prediction neural network to generate a height map for a digital object. The algorithms and acts described with reference to FIG. 3A can comprise the corresponding structure for performing a step for generating a height map for a digital object portrayed in a digital image. Further, the height prediction neural network architecture described with reference to FIG. 3B can comprise the corresponding structure for performing a step for generating a height map for a digital object portrayed in a digital image.

Figure 3C:
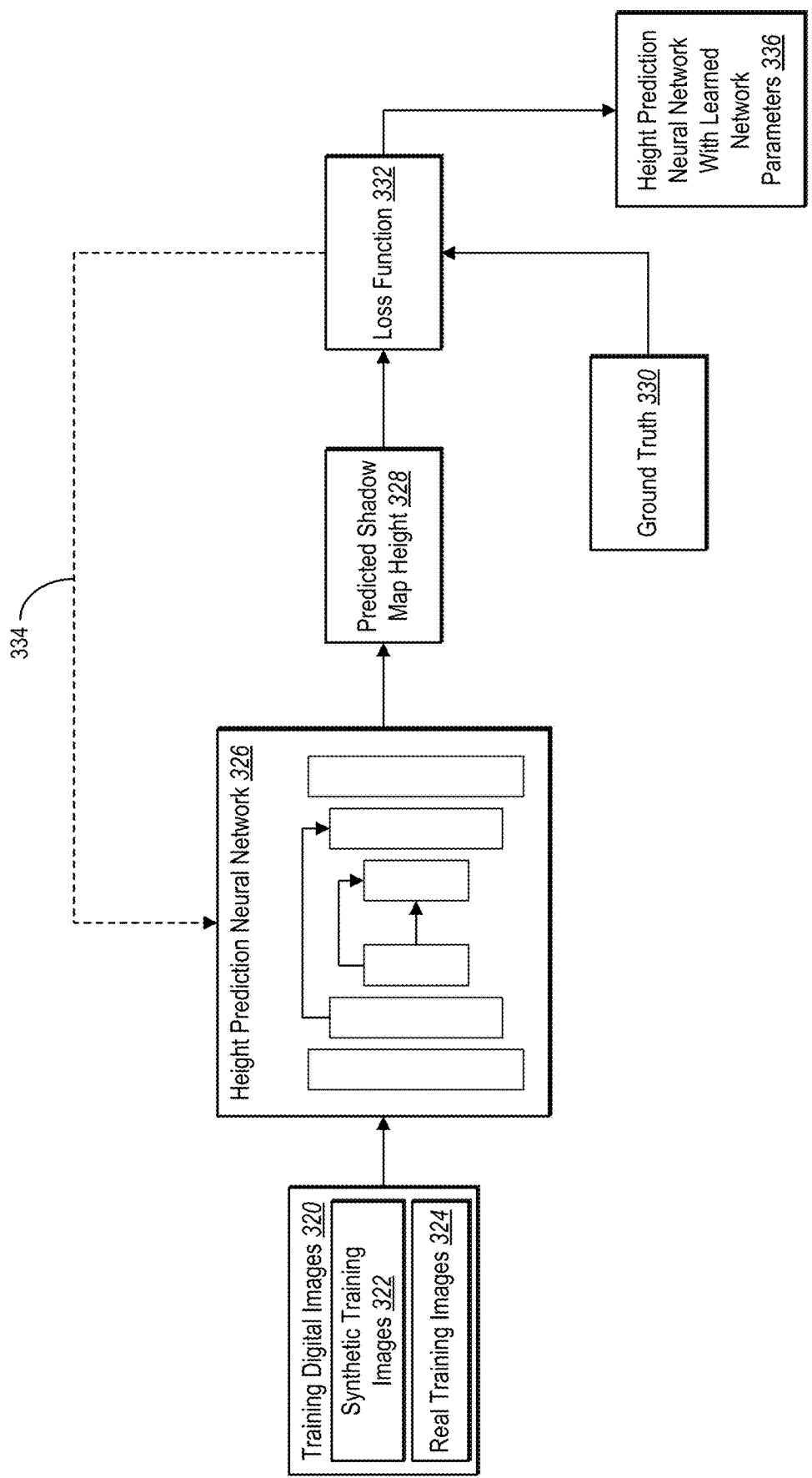
FIG. 3C illustrates a diagram for generating a height prediction neural network to generate height maps in accordance with one or more embodiments.

In one or more embodiments, the height-based shadowing system 106 generates (e.g., trains) a height prediction neural network to generate height maps for digital objects portrayed in digital images. FIG. 3C illustrates a diagram for generating a height prediction neural network to generate height maps in accordance with one or more embodiments.

Indeed, as shown in FIG. 3C, the height-based shadowing system 106 utilizes training digital images 320 for generating a height prediction neural network 326. In particular, as shown in FIG. 3C, the training digital images 320 include synthetic training images 322 and real training images 324. In one or more embodiments, the synthetic training images 322 include computer-generated digital images. For instance, in some cases, the synthetic training images 322 include computer-generated three-dimensional models of digital objects. In some cases, the synthetic training images 322 include various poses for each of the generated three-dimensional models. For each pose of a three-dimensional model, the synthetic training images 322 include images captured from different angles. In some implementations, the real training images 324 includes photographs (e.g., digital photographs).

As illustrated in FIG. 3C, the height-based shadowing system 106 utilizes the height prediction neural network 326 to analyze a training digital image from the training digital images 320 (e.g., one of the synthetic training images 322 or the real training images 324) and generate a predicted height map 328 based on the analysis. Further, the height-based shadowing system 106 compares the predicted height map 328 to a ground truth 330 via a loss function 332.

In one or more embodiments, the ground truths corresponding to the synthetic training images 322 include the pixel heights of the three-dimensional models of the digital objects depicted in the synthetic training images 322. For instance, in some cases, the ground truths corresponding to the synthetic training images 322 include object masks corresponding to two-dimensional images captured from the posed three-dimensional models and the pixel heights for the pixels represented within the object masks.

Further, in some embodiments, the ground truths corresponding to the real training images 324 include one or more annotations for the digital objects depicted in the real training images 324. To illustrate, in one or more embodiments, the ground truth corresponding to each real training image includes one or more labels (e.g., annotations) provided via user interaction, where a label includes a line drawn from a point of a digital object portrayed in the real training image to a point on the ground surface portrayed in the real training image. In particular, in some cases, each label shows the projection of a point from the digital object to the ground surface. In one or more embodiments, the ground truth corresponding to each real training image further includes a measurement of the length of each line (e.g., the pixel height of the object corresponding to the drawn line). In some cases, the ground truths further include dense pixel heights maps for the digital objects determined via bi-linear interpolation using the annotations.

In one or more embodiments, the height-based shadowing system 106 compares the predicted height map 328 to the ground truth 330 to determine a loss (i.e., an error) of the height prediction neural network 326. In some embodiments, where the ground truth 330 corresponds to a real training image, the height-based shadowing system 106 determines the loss corresponding to the one or more labels showing a projection of a point of the portrayed digital object to the ground surface.

As shown in FIG. 3C, the height-based shadowing system 106 back propagates the determines loss to the height prediction neural network 326 (as shown by the dashed line 334) to update the parameters of the height prediction neural network 326. In particular, the height-based shadowing system 106 updates the parameters to minimize the error of the height prediction neural network 326 in generating height maps for digital objects portrayed in digital images.

Though FIG. 3C illustrates generating the height prediction neural network 326 using one refinement iteration, it should be noted that, in some embodiments, the height-based shadowing system 106 generates the height prediction neural network 326 using multiple refinement iterations. In one or more embodiments, with each iteration of refinement, the height-based shadowing system 106 gradually improves the accuracy with which the height prediction neural network 326 generates height maps for digital objects. Thus, the height-based shadowing system 106 generates the height prediction neural network with learned network parameters 336.

Indeed, as shown in FIG. 3C, the height-based shadowing system 106 generates a height prediction neural network using synthetic training images and real training images. In some cases, however, the height-based shadowing system 106 generates the height prediction neural network using only synthetic training images or only real training images.

In some implementations, generating a height prediction neural network from both synthetic training images and real training images improves the ability of the height prediction neural network to generate height maps. For instance, in some cases, using synthetic training images and real training images reduces the artifacts present in the height maps that are generated by the height prediction neural network.

Figure 4A:
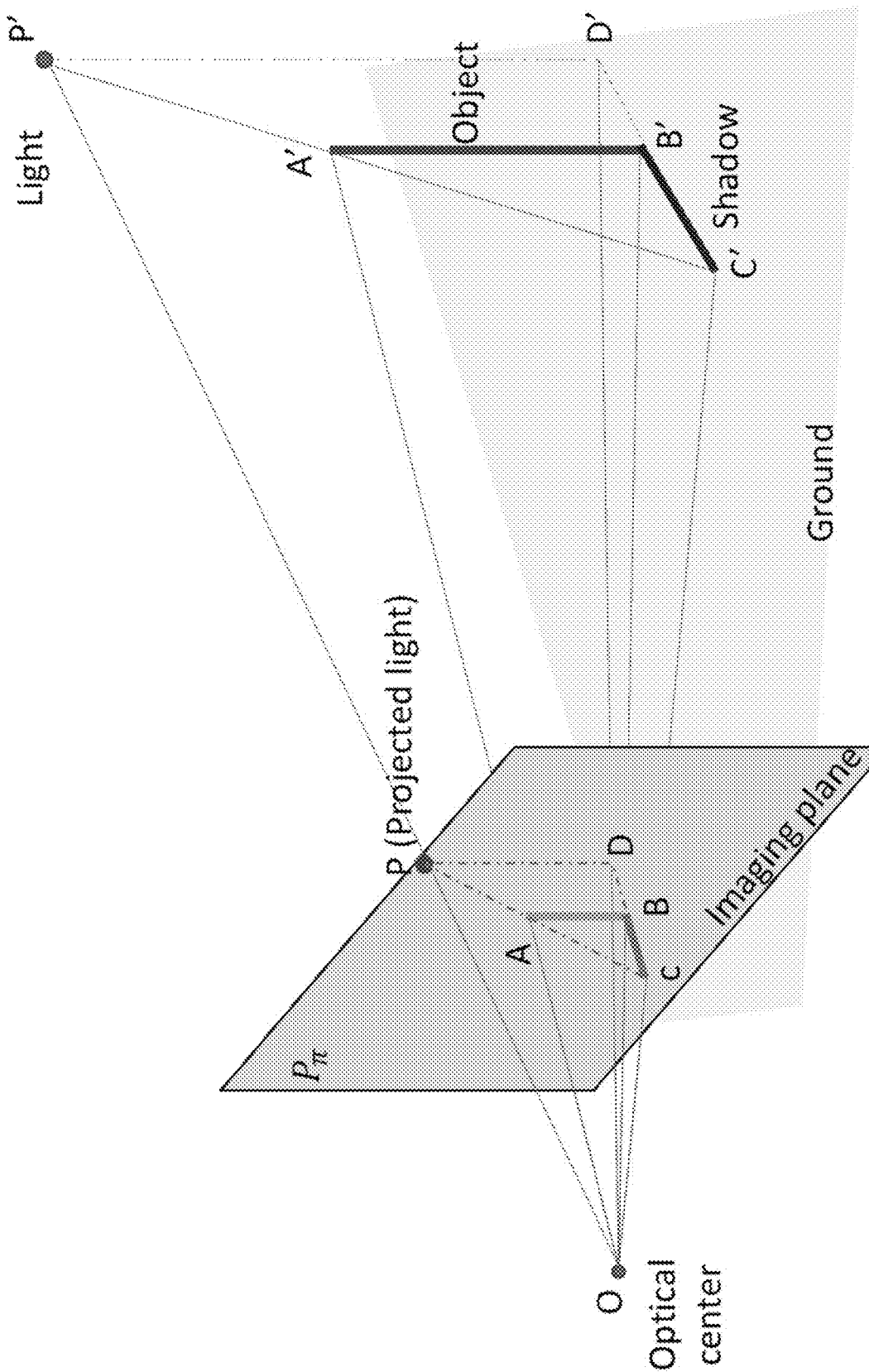
FIGS. 4A-4B illustrate diagrams for determining shadow projections for the pixels of a digital object using a height map and light source information in accordance with one or more embodiments.
Figure 4B:
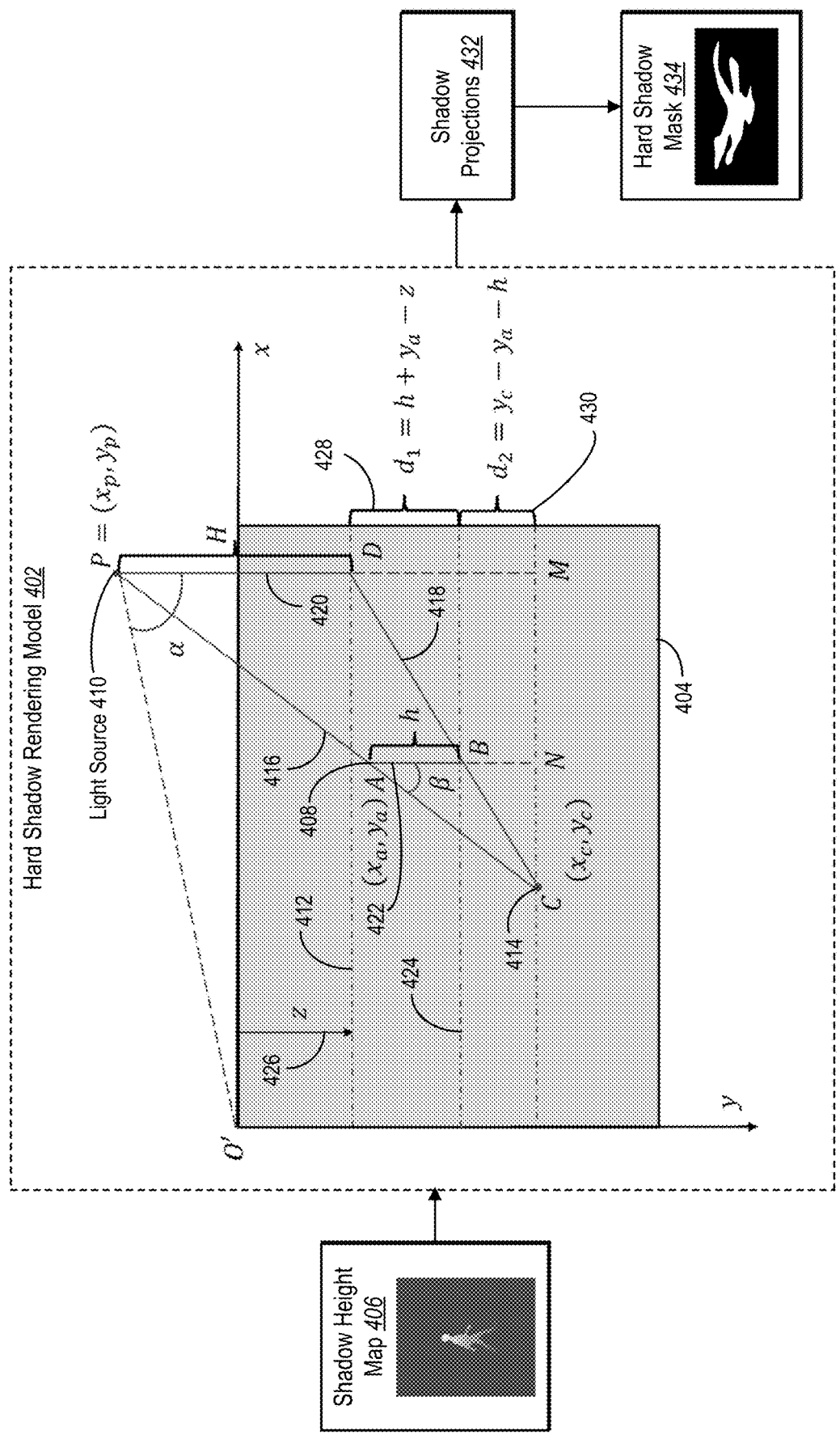

As mentioned above, in one or more embodiments, the height-based shadowing system 106 utilizes a height map for a digital object to determine a shadow projection of the digital object. In particular, the height-based shadowing system 106 determines shadow projections for the pixels of the height map. As further discussed, in one or more embodiments, the height-based shadowing system 106 determines the shadow projections using light source information associated with the digital image portraying the digital object. FIGS. 4A-4B illustrate diagrams for determining shadow projections for the pixels of a digital object using a height map and light source information in accordance with one or more embodiments.

FIG. 4A illustrates projection correlations in accordance with one or more embodiments. In particular, FIG. 4A illustrates correlations between an object in the physical world, casting a shadow and how that object and shadow are captured within an image space portrayed by a digital image. As shown in FIG. 4A, the line A'B' represents the object standing on the ground in the physical world. When a light source P' illuminates the environment, the object casts a shadow represented by the line B'C'. When the scene is captured by a digital image, the light source, the object, and the shadow are projected to P, AB, and BC, respectively. D' represents the vertical projection of the light source P' onto the ground, and D' is projected to D within the captured digital image. It can be noted that P', A', and C' are co-linear while C', B', and D' are also co-linear.

The height-based shadowing system 106 utilizes a height map to generate an object shadow for a digital object portrayed within a digital image in accordance with the projection correlations shown in FIG. 4A. Indeed, as mentioned above, various factors can cause a digital image to not portray an object shadow for a digital object depicted therein. For instance, the digital image can be the result of image composition or otherwise the result of editing the digital image to include the digital object so that the scene captured by the digital image did not include the real-world object corresponding to the digital object Accordingly, the height-based shadowing system 106 can generate an object shadow to portray a shadow that would have been captured had the real-world object been present when the digital image was captured.

FIG. 4B illustrates a diagram for determining the shadow projection of a pixel 408 (represented as A) of a digital object using a hard shadow rendering model 402. In one or more embodiments, the digital object that includes the pixel 408 is portrayed in a digital image having boundaries represented by the box 404. Further, the height-based shadowing system 106 utilizes the height map 406—which includes a pixel height for the pixel 408—to determine the shadow projection for the pixel 408.

As shown in FIG. 4B, the height-based shadowing system 106 identifies a position of the pixel 408 within the digital image portraying the corresponding digital object. In one or more embodiments, the height-based shadowing system 106 defines the position using the coordinate $x_a$ representing the horizontal position of the pixel 408 and the coordinate $y_a$ representing the vertical position of the pixel 408. In some embodiments, the height-based shadowing system 106 defines the position using a coordinate scheme associated with the digital image, such as the coordinate scheme used to generate the height map 406 discussed above with reference to FIG. 3A. In some cases, however, the height-based shadowing system 106 utilizes a different coordinate scheme. For instance, for the digital image shown in FIG. 4B, the height-based shadowing system 106 can use coordinate scheme that locates the origin at the upper left corner of the digital image and increases the value of x and y as it moves horizontally to the right and vertically down, respectively, from the origin.

As further shown in FIG. 4B, the height-based shadowing system 106 identifies a position of a light source 410 (represented as P and located at point $(x_p, y_p)$) for the digital image and a position of a horizon 412 corresponding to the digital image. As mentioned above, in some cases, the height-based shadowing system 106 determines the positions of the light source 410 and/or the horizon 412 via user input. In some cases, the height-based shadowing system 106 determines the positions of the light source 410 and/or the horizon 412 by analyzing one or more shadows already present in the digital image. For instance, in at least one implementation, the height-based shadowing system 106 determines the positions by performing the inverse calculations of those described below using one or more shadows already present in the digital image. Additionally, the height-based shadowing system 106 determines the projection 420 of the light source 410 onto the horizon 412 (with the distance of the projection represented as H and the resulting projection point represented as D).

As shown in FIG. 4B, the light source 410 is positioned out of the digital image frame. In some instances, however, the height-based shadowing system 106 determines that the light source 410 is within the frame of the digital image. Indeed, as discussed above, the height-based shadowing system 106 identifies a light source for the digital image using an object detection model in some embodiments.

As further illustrated in FIG. 4B, the height-based shadowing system 106 determines the shadow projection for the pixel 408 by determining a position for a corresponding shadow pixel 414 (represented as C). In particular, the height-based shadowing system 106 determines the position for the corresponding shadow pixel 414 having the coordinate $x_c$ representing the horizontal position of the corresponding shadow pixel 414 and the coordinate $y_c$ representing the vertical position of the corresponding shadow pixel 414.

As shown, the height-based shadowing system 106 determines the position of the corresponding shadow pixel 414 based on the position of the pixel 408, the position of the light source 410, and the position of the horizon 412. For instance, as shown in FIG. 4B, the height-based shadowing system 106 determines the corresponding shadow pixel 414 to be located at the intersection of two lines: a first line 416 that includes the light source 410 and the pixel 408; and a second line 418 that includes the projection 420 of the light source 410 onto the horizon 412 and a projection 422 of the pixel 408 onto a ground surface 424 of the digital image (with the distance of the projection represented ash and the resulting projection point represented as B). In other words, the height-based shadowing system 106 determines that the corresponding shadow pixel 414 is positioned at the intersection of the extensions of line PA and line DB. As indicated by FIG. 4B, the distance of the projection 422 of the pixel 408 onto the ground surface 424—the value of h—corresponds to the pixel height for the pixel 408 included within the height map 406.

As illustrated by FIG. 4B, in some embodiments, the height-based shadowing system 106 determines the position of the corresponding shadow pixel 414 using various values determined from the digital image. For example, as shown, the height-based shadowing system 106 determines the vertical distance 426 from the top of the digital image to the horizon 412 in the image space (represented as Z). Further, the height-based shadowing system 106 determines the vertical distance 428 (e.g., in the image space) between the horizon 412 and the ground surface 424 (represented as $d_1$). Additionally, the height-based shadowing system 106 determines the vertical distance 430 between the ground surface 424 and the vertical position of the corresponding shadow pixel 414 (represented as $d_2$). Indeed, as shown in FIG. 4B, the height-based shadowing system 106 defines the following:

$$d_1 = h + y_a - Z \quad (1)$$

$$d_2 = y_c - y_a - h \quad (2)$$

In one or more embodiments, the height-based shadowing system 106 determines the position for the corresponding shadow pixel 414 based on the triangle similarity between ΔANC and ΔPMC. For example, in some cases, the height-based shadowing system 106 utilizes the triangle similarity to determine the following relations:

$$\begin{cases} \dfrac{h}{d_2} = \dfrac{H}{d_1 + d_2} \\ \tan\alpha = \dfrac{x_p}{H - Z} \\ \tan\beta = \dfrac{x_p - x_c}{H + d_1 + d_2} \end{cases} \quad (3)$$

Thus, the height-based shadowing system 106 utilizes equation 3 to determine the position for the corresponding shadow pixel 414 as follows:

$$\begin{cases} y_c = \dfrac{Hh + Hy_a - hZ}{H - h} \\ x_c = \tan\alpha(H - Z) - \tan\beta(H + y_c - Z) \end{cases} \quad (4)$$

Thus, using the process described above, the height-based shadowing system 106 determines the shadow projections 432 for the pixels of the digital object portrayed in the digital image. In particular, the height-based shadowing system 106 determines the positions for the shadow pixels that correspond to the pixels of the digital object. Further, as illustrated, the height-based shadowing system 106 utilizes the height map 406 generated for the digital object in determining the shadow projections 432.

As shown in FIG. 4B, the height-based shadowing system 106 utilizes the shadow projections 432 to generate a hard shadow mask 434 for the digital object. To illustrate, in one or more embodiments, upon determining the locations for shadow pixels for the digital image, the height-based shadowing system 106 determines an object shadow for the digital object. In particular, the height-based shadowing system 106 determines a hard object shadow for the digital image. For instance, in some cases, the height-based shadowing system 106 generates the shadow pixels corresponding to the pixels of the digital object at the locations indicated by the shadow projections 432, generating a hard shadow object for the digital object. Further, the height-based shadowing system 106 generates the hard shadow mask 434 from the hard shadow object.

Thus, the height-based shadowing system 106 utilizes the shadow projections 432—the locations for the shadow pixels corresponding to a digital object based on the pixels heights of those pixels and the light source information for the digital image—to generate the hard shadow mask 434 corresponding to a hard object shadow for the digital object. In some cases, the height-based shadowing system 106 generates shadow pixels at the locations indicated by the shadow projections 432 and utilizes the generated shadow pixels to generate the hard shadow mask 434.

In one or more embodiments, the height-based shadowing system 106 generates the shadow pixels from the shadow projections 432 using a forward tracing projection model. In particular, the height-based shadowing system 106 determines the shadow projection of each pixel of the digital object portrayed in the digital image and generates a corresponding shadow pixel. In some implementations, however, the height-based shadowing system 106 determines the shadow pixels from the shadow projections 432 using a back tracing projection model where the height-based shadowing system 106 generates a shadow pixel from a shadow projection upon determining that the shadow pixel will be visible within the digital image (e.g., isn't obstructed from view by some other object portrayed in the digital image).

In some cases, the height-based shadowing system 106 determines that a shadow pixel corresponding to a pixel of a digital images is positioned beyond the boundaries of the digital image. Accordingly, in some cases, the height-based shadowing system 106 generates a hard shadow mask only using those shadow pixels determined to be located within the boundaries of the digital image (e.g., only generates shadow pixels that are determined to be located within the digital image).

Figure 5:
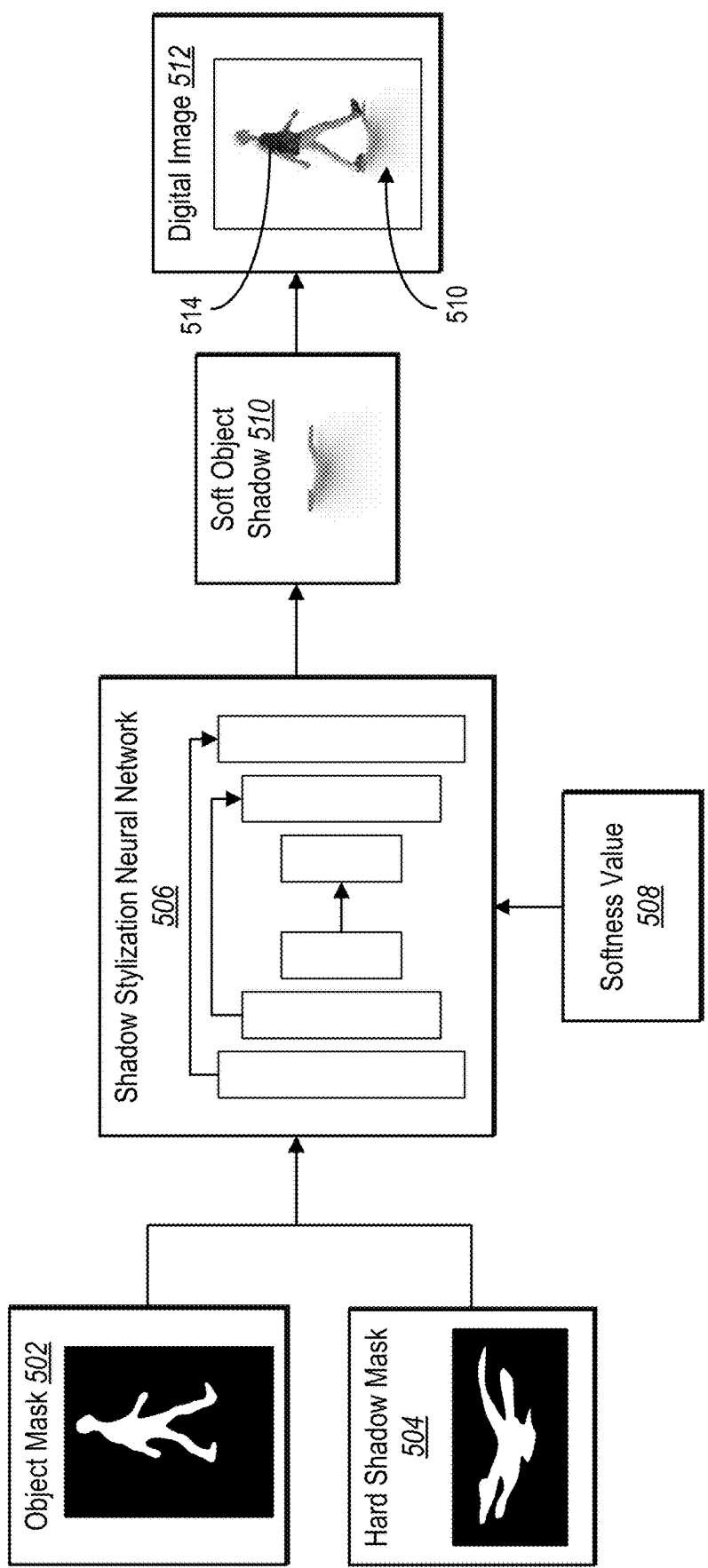
FIG. 5 illustrates a diagram for generating a soft object shadow utilizing a shadow stylization neural network in accordance with one or more embodiments.

As previously mentioned, in one or more embodiments, the height-based shadowing system 106 utilizes a shadow stylization neural network to generate a soft object shadow for a digital object portrayed in a digital image. In particular, the height-based shadowing system 106 utilizes a shadow stylization neural network to generate a soft object shadow from a hard shadow mask generated using the height map for the digital object. FIG. 5 illustrates a diagram for generating a soft object shadow utilizing a shadow stylization neural network in accordance with one or more embodiments.

Indeed, as shown in FIG. 5, the height-based shadowing system 106 provides an object mask 502 and a hard shadow mask 504 corresponding to a digital object portrayed in a digital image to a shadow stylization neural network 506. In one or more embodiments, the height-based shadowing system 106 generates the object mask 502 for the digital object as discussed above with reference to FIG. 3A. Further, in some cases, the height-based shadowing system 106 generates the hard shadow mask 504 for the digital object as discussed above with reference to FIG. 5. As illustrated, the height-based shadowing system 106 utilizes the shadow stylization neural network 506 to generate a soft object shadow 510 from the object mask 502 and the hard shadow mask 504.

In one or more embodiments, the shadow stylization neural network 506 includes a neural network having an encoder-decoder neural network architecture. To illustrate, in some embodiments, the shadow stylization neural network 506 utilizes an encoder to encode the neural network inputs (e.g., the object mask 502 and the hard shadow mask 504) and utilizes the decoder to generate a neural network output (e.g., the soft object shadow 510). In some implementations, the shadow stylization neural network 506 further includes one or more skip links with each skip link providing the output of at least one layer of the encoder to at least one layer of the decoder.

As further shown in FIG. 5, the height-based shadowing system 106 provides a softness value 508 to the shadow stylization neural network 506. Indeed, as shown, the height-based shadowing system 106 utilizes the shadow stylization neural network 506 to generate the soft object shadow 510 further based on the softness value 508. In one or more embodiments, the height-based shadowing system 106 determines the softness value 508 from user input. For example, in some cases, the height-based shadowing system 106 receives the softness value 508 from a client device or otherwise determines the softness value 508 based on user input received from a client device (e.g., based on user interactions with a softness control provided within a graphical user interface displayed on the client device). In some implementations, the height-based shadowing system 106 utilizes a pre-determined softness value, a default softness value, or a softness value determined from user preferences.

In one or more embodiments, the height-based shadowing system 106 provides the softness value 508 to the shadow stylization neural network 506 by providing the softness value 508 to one or more of the decoder layers. To illustrate, in some implementations, the height-based shadowing system 106 defines the softness value 508 as a two-dimensional feature map (e.g., a two-dimensional vector that indicates the softness of the object shadow for each shadow pixel associated with the object shadow). Further, the height-based shadowing system 106 concatenates the two-dimensional feature map with the input (or output) of one or more layers of the decoder of the shadow stylization neural network 506, such as one or more of the initial layers of the decoder. Accordingly, in some cases, the layers of the decoder analyze the softness information from the softness value 508 as it generates the soft object shadow 510.

In one or more embodiments, the height-based shadowing system 106 generates (e.g., trains) the shadow stylization neural network 506 for use in generating soft object shadows for digital objects. In some cases, the height-based shadowing system 106 generates the shadow stylization neural network 506 by utilizing multiple refinement iterations to refine its parameters and improve its accuracy in generating soft object shadows. To illustrate, in some cases, the height-based shadowing system 106 utilizes the shadow stylization neural network 506 to analyze a training object mask and a training hard shadow mask for a given refinement iteration. Further, the height-based shadowing system 106 provides a training softness value to the shadow stylization neural network 506. Accordingly, the height-based shadowing system 106 utilizes the shadow stylization neural network 506 to generate a predicted soft object shadow, compares the predicted soft object shadow to a ground truth via a loss function, and back propagates the determined loss to the shadow stylization neural network 506 to update its parameters.

In some cases, the height-based shadowing system 106 utilizes synthetic images to generate the shadow stylization neural network 506. In particular, the height-based shadowing system 106 utilizes training hard shadow masks and training object masks generated from synthetic training images. In some cases, the height-based shadowing system 106 utilizes real images or a combination of synthetic and real images to generate the shadow stylization neural network 506. To illustrate, in some embodiments, the height-based shadowing system 106 utilizes synthetic images composed of three-dimensional models as the training images and further utilizes a physics-based shadow rendering model to generate soft object shadows from the three-dimensional models for use as the corresponding ground truths. For instance, in some cases, the height-based shadowing system 106 utilizes the physics-based rendering model described in PBR Render, https://substance3d.adobe.com/documentation/sddoc/pbr-render-194216472.html, 2021, the entire contents of which are hereby incorporated by reference in their entirety.

In one or more embodiments, the height-based shadowing system 106 generates the shadow stylization neural network 506 simultaneously with the height prediction neural network. In some cases, however, the height-based shadowing system 106 generates each neural network via a separate process.

Further, as shown, the height-based shadowing system 106 utilizes the soft object shadow 510 generated from the shadow stylization neural network 506 to modify a digital image 512. In particular, the height-based shadowing system 106 modifies the digital image 512 to include the soft object shadow 510. For example, as shown in FIG. 5, the height-based shadowing system 106 modifies the digital image so that the digital object 514 portrayed in the digital image 512 appears to be casting the soft object shadow 510 in accordance with lighting conditions associated with the digital image 512.

Figure 6B:
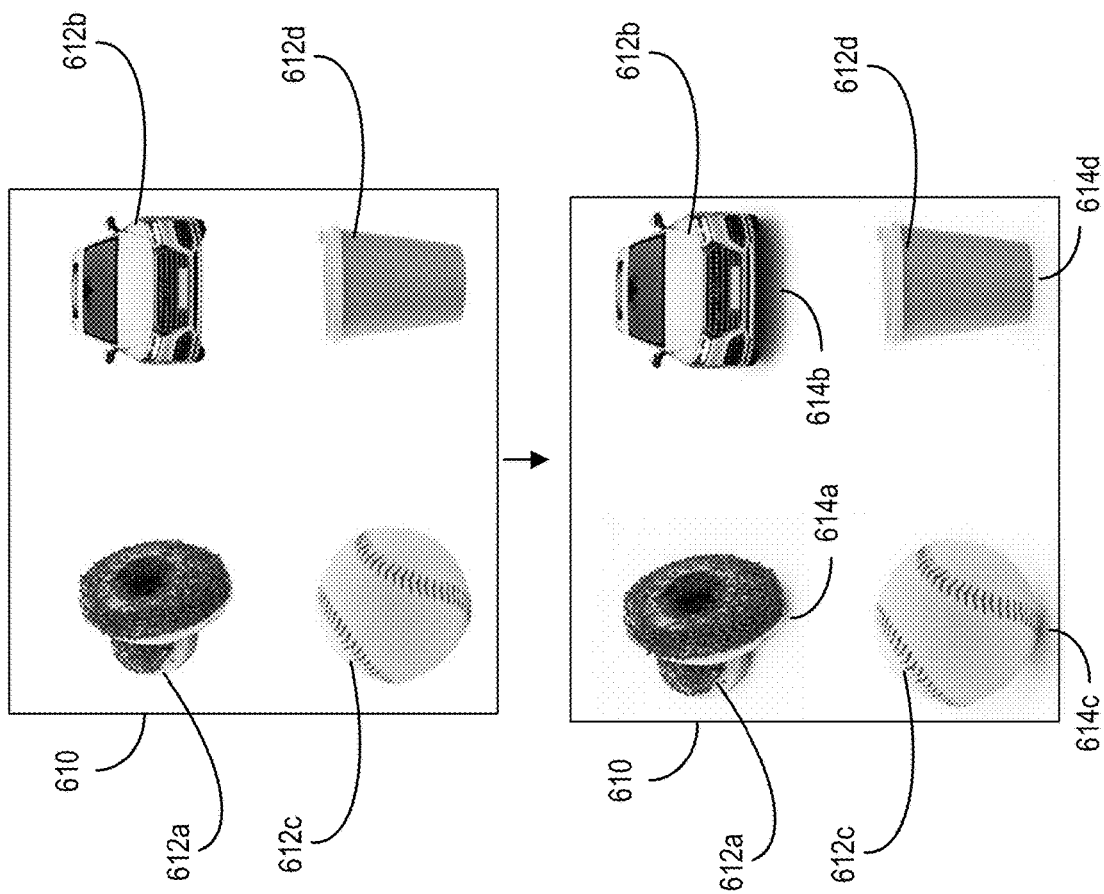

One or more embodiments of the height-based shadowing system 106 can generate object shadows (e.g., soft object shadows) for digital objects portrayed in a variety of digital images. Accordingly, one or more embodiments of the height-based shadowing system 106 can modify a variety of digital images to include object shadows. FIGS. 6A-6C illustrate modifying various digital images to include object shadows for digital objects displayed therein in accordance with one or more embodiments.

In particular, FIG. 6A illustrates modifying a digital photo 602 to include object shadows 604a-604b for the digital objects 606a-606b displayed therein. In one or more embodiments, the digital photo 602 includes a digital image created by extracting the digital objects 606a-606b from another digital photo and inserting the digital objects 606a-606b into the digital photo 602 (e.g., via an image composition process.) Accordingly, in some implementations, the digital photo 602 does not initially include object shadows for the digital object 606a-606b.

As shown in FIG. 6A, the height-based shadowing system 106 generates the object shadows 604a-604b for the digital objects 606a-606b. Additionally, the height-based shadowing system 106 modifies the digital photo 602 to include the object shadows 604a-604b. As further shown, the object shadows 604a-604b are complementary to the other object shadows that were already present in the digital photo 602. In other words, the height-based shadowing system 106 generated the object shadows 604a-604b using the lighting conditions (e.g., the light source information) that caused the other object shadows. Thus, in one or more embodiments, the height-based shadowing system 106 generates object shadows to facilitate accurate (e.g., realistic) incorporation of digital objects into digital photographs.

FIG. 6B illustrates modifying a digital image 610 that portrays multiple digital objects 612a-612d to include object shadows 614a-614d for the digital objects 612a-612d. In one or more embodiments, the digital objects 612a-612d include products to be advertised for sale (e.g., via a web page of an e-commerce site). As shown in FIG. 6B, the height-based shadowing system 106 modifies the digital image 610 to include the object shadows 614a-614d. In some cases, the height-based shadowing system 106 generates the object shadows 614a-614d to provide the digital objects 612a-612d with more realistic and marketable appearance. As illustrated, the object shadows 614a-614d are consistent. In other words, the object shadows 614a-614d provide the appearance that the digital objects 612a-612d are subject to the same lighting conditions.

Though FIG. 6B is discussed as having a single digital image with a plurality of digital objects, the digital objects portrayed therein can be included in a plurality of digital objects in some instances. Indeed, in one or more embodiments, the height-based shadowing system 106 modifies a plurality of digital images—each portraying at least one digital object—to include object shadows. For instance, as mentioned above, the digital images can represent image assets of products to be advertised on an e-commerce site. In one or more embodiments, the height-based shadowing system 106 modifies the plurality of digital images via a batch process. Further, in some cases, the height-based shadowing system 106 generates the object shadows for the depicted digital objects using common (e.g., preset) light source information to provide an appearance of consistent lighting conditions among the digital images. Thus, the height-based shadowing system can provide decorative shadows having a consistent appearance among various digital images that are to be presented within a common framework, such as a website.

FIG. 6C illustrates modifying a digital image 620 that portrays a computer-generated digital object 622. In particular, as seen in FIG. 6C, the digital object 622 includes an illustrated digital object, such as an illustration created using vector graphics. As shown in FIG. 6C, the height-based shadowing system 106 modifies the digital image. 620 to include an object shadow 624 for the digital object. Thus, the height-based shadowing system 106 can generate, and modify digital images to include, object shadows (e.g., soft object shadows) for real digital objects (e.g., digital objects that exist in the physical world) and computer-generated digital objects. In particular, the height-based shadowing system 106 can generate a height map for various types of digital objects, utilize the height map to generate an object shadow, and modify the digital image portraying the digital object to include the object shadow.

Further, in one or more embodiments, the height-based shadowing system 106 generates an object shadow for an animated digital object portrayed in an animated sequence (e.g., a digital video) and modifies the animated sequence to include the object shadow. To illustrate, in one or more embodiments, the height-based shadowing system 106 generates an object shadow for the digital object for each frame of the animated sequence that portrays the digital object (e.g., generates a height map for the digital object and generates the object shadow using the height map and corresponding light source information). Further, the height-based shadowing system 106 modifies the frames of the animated sequence that portray the digital object to include the object shadow. Thus, the height-based shadowing system 106 modifies the animated sequence to include an object shadow that tracks the movement of the digital object. For instance, the object shadow can change as the position of the digital object relative to the position of the light source changes throughout the animated sequence.

By generating object shadows using shadow projections determined from a height map, the height-based shadowing system 106 operates more accurately than conventional systems. In particular, the height-based shadowing system 106 generates object shadows that more accurately portray the shadow of an object under the lighting conditions of a digital image. For instance, by using a height map, instead of a three-dimensional model, to determine shadow projections, the height-based shadowing system 106 avoids the errors that result from use of the three-dimensional models, such as the artifacts that appear in the final shadows. Further, by using height maps and corresponding light source information, the height-based shadowing system improves upon the modeling of the object geometry and lighting to create more realistic object shadows.

Further, the height-based shadowing system 106 generates object shadows with greater efficiency when compared to many conventional systems. Indeed, as previously mentioned, physics-based shadow rendering objects employed by many conventional systems consume a significant amount of computing resources when generating object shadows from three-dimensional models. By generating object shadows from height maps, the height-based shadowing system 106 reduces the computing resources consumed. Further, the height-based shadowing system generates object shadows with reduced user interaction. In particular, by generating and using a height map corresponding to a digital object, the height-based shadowing system avoids the need for user interactions to adjust a three-dimensional model to correctly align the model with the digital object. Accordingly, the height-based shadowing system reduces the user interactions, time, and computing resources required for generating an object shadow with a desired (e.g., realistic) visual appearance.

Figure 7:
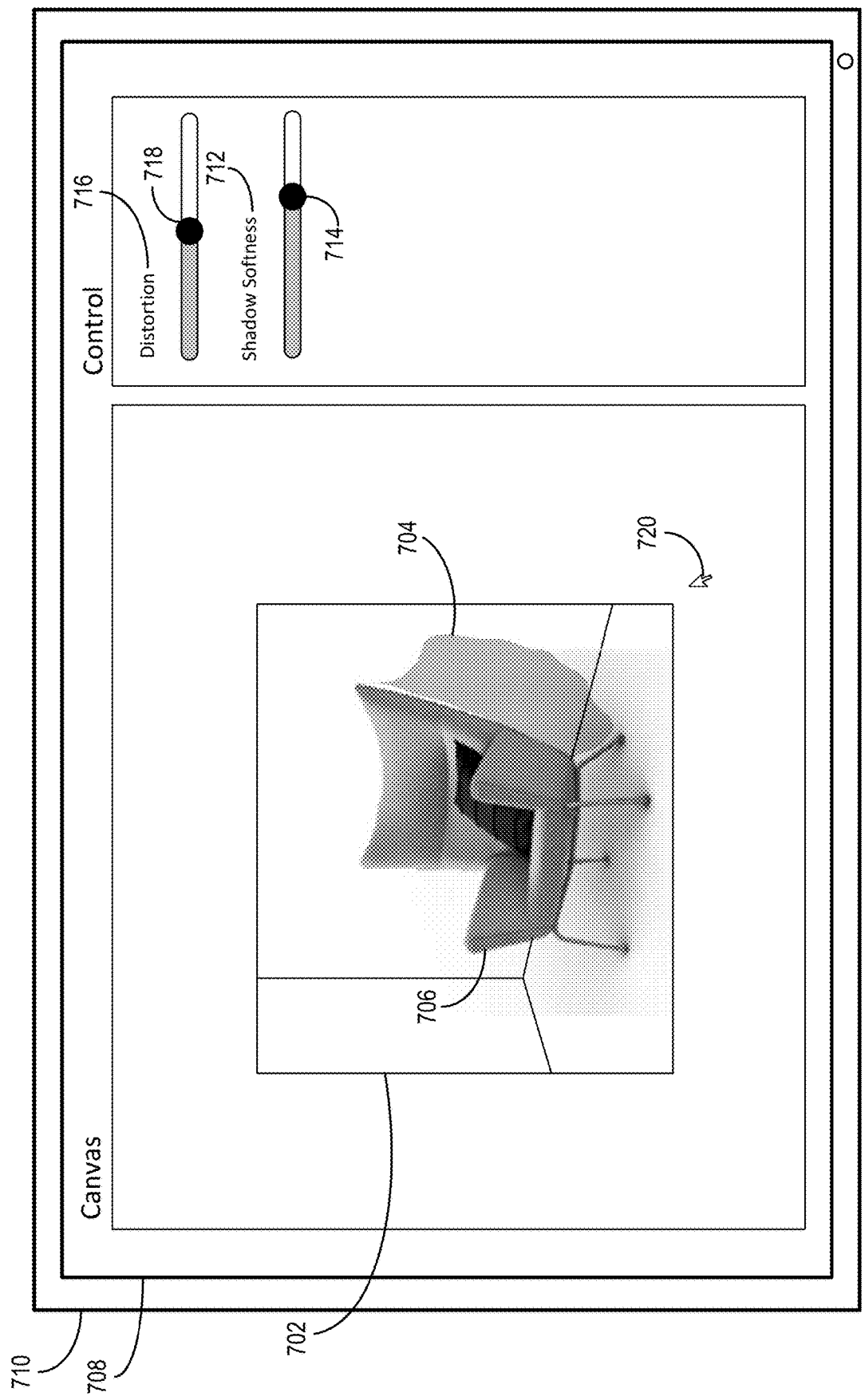
FIG. 7 illustrates a graphical user interface used by the height-based shadowing system for displaying a digital image and to enable user interaction for further changes in accordance with one or more embodiments.

As previously mentioned, in one or more embodiments, the height-based shadowing system 106 provides a digital image modified to include an object shadow for display within a graphical user interface of a client device. Further, the height-based shadowing system 106 modifies the object shadow within the digital image in response to one or more user interactions with the graphical user interface. FIG. 7 illustrates a graphical user interface used by the height-based shadowing system 106 for displaying a digital image and to enable user interaction for further changes in accordance with one or more embodiments.

Indeed, as shown in FIG. 7, the height-based shadowing system 106 provides a digital image 702 for display within a graphical user interface 708 of a client device 710. In particular, the digital image 702 includes a digital image that has been modified to include an object shadow 704 for a digital object 706 portrayed therein. In one or more embodiments, the height-based shadowing system 106 generates the object shadow 704 using a height map as discussed above.

As shown in FIG. 7, the object shadow 704 covers a portion of a non-planar surface (e.g., the object shadow 704 extends across a horizontal floor surface and a vertical wall surface portrayed in the digital image 702. Indeed, in one or more embodiments, the height-based shadowing system 106 generates object shadows across one or more non-planar surfaces. For instance, in one or more embodiments, the height-based shadowing system 106 utilizes a height map generated for a digital object to determine a shadow projection of the digital object (e.g., determine shadow projections of the pixels of the digital object) across a non-planar surface.

As further shown, the height-based shadowing system 106 provides a softness control 712 within the graphical user interface 708. In one or more embodiments, the height-based shadowing system 106 provides the softness control 712 to indicate a current softness of the object shadow 704 (e.g., via a position of the interactive element 714). Further, in one or more embodiments, the height-based shadowing system 106 detects a user interaction with the softness control 712. In particular, the height-based shadowing system 106 detects a user interaction repositioning the interactive element 714.

In some embodiments, in response to detecting the user interaction with the softness control 712, the height-based shadowing system 106 modifies the object shadow 704 within the digital image 702. To illustrate, in some cases, the height-based shadowing system 106 determines a softness value corresponding to the position of the interactive element 714 caused by the user interaction. Further, the height-based shadowing system 106 provides the softness value to the shadow stylization neural network used to generate soft object shadow and uses the shadow stylization neural network to modify the object shadow 704 (e.g., by generating a modified object shadow). Accordingly, the height-based shadowing system 106 facilitates flexible control over the softness of a generated object shadow.

Additionally, as shown, the height-based shadowing system 106 provides a distortion control 716 within the graphical user interface 708. In one or more embodiments, the height-based shadowing system 106 provides the distortion control 716 to indicate a position of the horizon corresponding to the digital image 702 (e.g., via a position of the interactive element 718). Further, in one or more embodiments, the height-based shadowing system 106 detects a user interaction with the distortion control 716. In particular, the height-based shadowing system 106 detects a user interaction repositioning the interactive element 718.

In some embodiments, in response to detecting the user interaction with the distortion control 716, the height-based shadowing system 106 modifies the object shadow 704 within the digital image 702. To illustrate, in some cases, the height-based shadowing system 106 determines a horizon position corresponding to the position of the interactive element 718 caused by the user interaction. Further, the height-based shadowing system 106 utilizes the hard shadow rendering model to determine modified shadow projections for the pixels of the digital object 706 based on the height map previously generated for the digital object 706, the position of the light source corresponding to the digital image 702, and the horizon position caused by the user interaction. The height-based shadowing system 106 modifies the object shadow 704 using the modified shadow projections (e.g., by generating a modified object shadow). Thus, the height-based shadowing system 106 facilitates flexible control over the distortion of a generated object shadow.

In some embodiments, the height-based shadowing system 106 detects a user interaction with the digital object 706 (e.g., via the cursor 720) and modifies the object shadow 704 based on the detected user interaction. For instance, in some cases, the height-based shadowing system 106 determines that the user interaction moves the digital object 706 vertically within the digital image 702. The height-based shadowing system 106 determines the vertical shift of the digital object 706 (e.g., the vertical shift of a monitored pixel of the digital object 706) and adds a shift value corresponding to the vertical shift to the pixels heights represented in the height map for the digital object 706. Using the shifted height values, the height-based shadowing system 106 utilizes the hard shadow rendering model described above to determine modified shadow projections for the pixels of the digital object 706. The height-based shadowing system 106 modifies the object shadow 704 using the modified shadow projections (e.g., by generating a modified object shadow). Thus, the height-based shadowing system 106 offers control over other characteristics of a generated object shadow (e.g., those corresponding to the vertical shift of the corresponding digital object). In some cases, where the user interaction moves the digital object 706 horizontally, the height-based shadowing system 106 determines modified shadow projections and generates a modified object shadow using the modified horizontal position.

In one or more embodiments, the height-based shadowing system 106 detects a user interaction with the object shadow 704 itself (e.g., via the cursor 720) and modifies the object shadow 704 based on the detected user interaction. In particular, in some embodiments, the height-based shadowing system 106 determines that the user interaction is for repositioning the object shadow 704 within the digital image 702, such as be moving the object shadow 704 around the digital object 706. In some implementations, the height-based shadowing system 106 determines a change in the position of the light source corresponding to the digital image 702 based on the user interaction and modifies the object shadow 704 based on the changed light source position.

To illustrate, in some cases, the height-based shadowing system 106 tracks the cursor 720 as it selects the object shadow 704 and moves around the digital object 706. Upon determining that the cursor 720 has stopped moving, the height-based shadowing system 106 determines the position of the cursor 720 and determines the modified position of the light source as if the position of the cursor 720 corresponded to a shadow pixel. In particular, the height-based shadowing system 106 calculates the modified position of the light source using the process described above with reference to FIG. 4B (including equations 1-4) in reverse. Further, the height-based shadowing system 106 determines modified shadow projections for the pixels of the digital object 706 based on the modified position of the light source modifies the object shadow 704 (e.g., generates a modified object shadow) using the modified shadow projections.

In one or more embodiments, rather than tracking the cursor 720, the height-based shadowing system 106 tracks a shadow pixel selected via the cursor 720 and modifies the object shadow 704 based on tracking the shadow pixel. Indeed, the height-based shadowing system 106 determines a modified position of the shadow pixel caused by the user interaction via the cursor 720, determines the modified light position by reversing the calculations described above with reference to FIG. 4B, and determines modified shadow projections corresponding to the other shadow pixels of the object shadow 704 using the modified light position. Thus, because there is an explicit pixel-level correspondence between the digital object 706 and the object shadow 704 (e.g., based on the determined shadow projections), the height-based shadowing system 106 can modify the position of the object shadow 704 efficiently and accurately.

In some embodiments, the height-based shadowing system 106 modifies the object shadow of multiple digital objects portrayed in a digital image based on one or more user interactions with one of the object shadows. For instance, in response to detecting a user interaction for repositioning the object shadow of one digital object, the height-based shadowing system 106 modifies the object shadow of other digital objects portrayed in the same digital image. Indeed, as mentioned above, the height-based shadowing system 106 determines a change in the position of the light source based on the user interaction for repositioning an object shadow. Accordingly, the height-based shadowing system 106 modifies the object shadows of the other digital objects using the modified position of the light source. Thus, the height-based shadowing system 106 enables efficient modification of multiple object shadows simultaneously.

By modifying an object shadow within a digital image in response to one or more user interactions with a graphical user interface displaying the digital image, the height-based shadowing system 106 operates more flexibly than conventional systems. Indeed, as discussed above, many conventional systems—such as those employing neural networks for generating object shadows—lack controls for manipulating the characteristics of the resulting object shadow. By modifying a generated object shadow as described above, the height-based shadowing system 106 provides flexible controls for modifying various characteristics of an object shadow, such as its position, angle, distortion, and/or softness.

Figure 8:
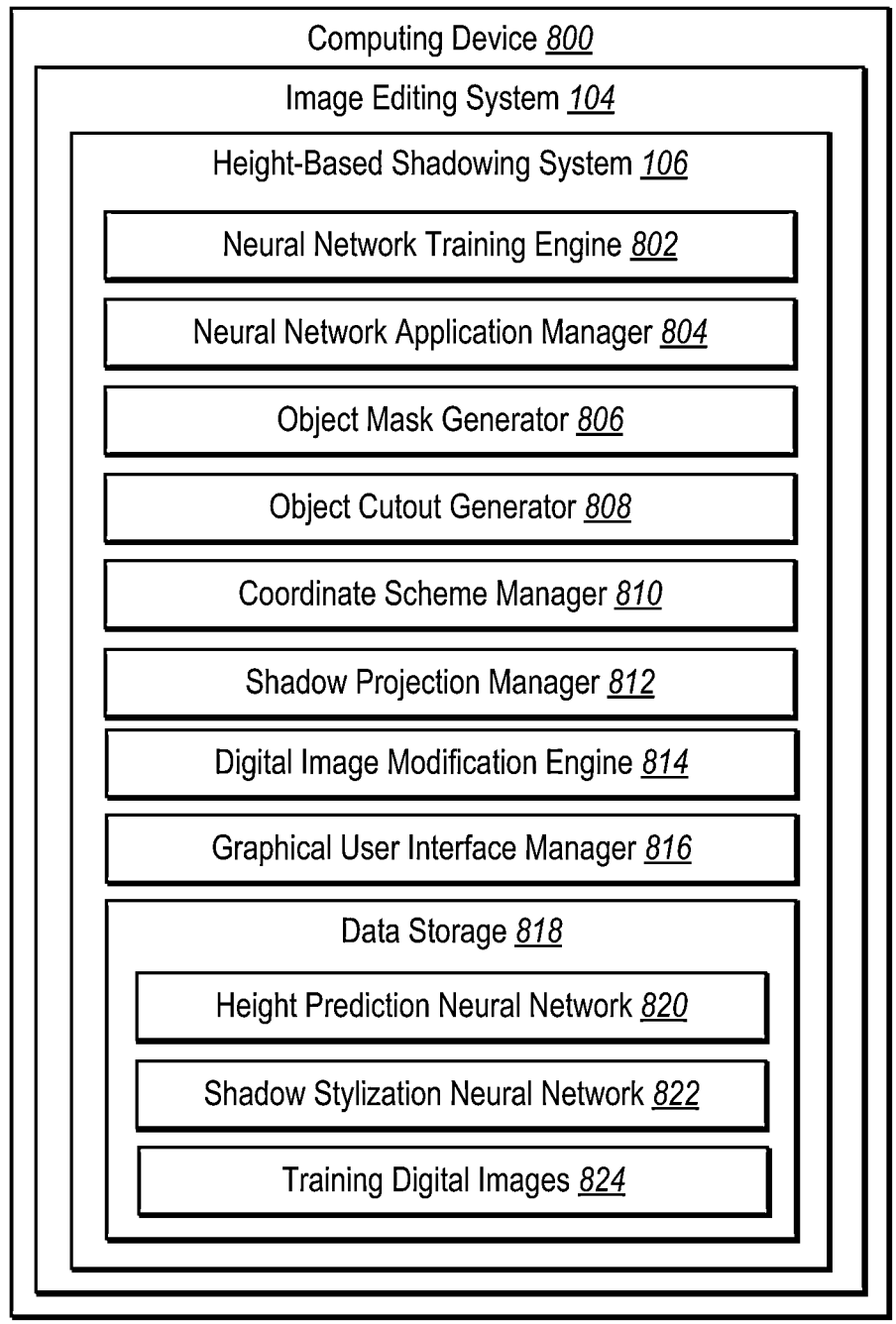
FIG. 8 illustrates an example schematic diagram of a height-based shadowing system in accordance with one or more embodiments.

Turning to FIG. 8, additional detail will now be provided regarding various components and capabilities of the height-based shadowing system 106. In particular, FIG. 8 illustrates the height-based shadowing system 106 implemented by the computing device 800 (e.g., the server(s) 102 and/or one of the client devices 110a-110n discussed above with reference to FIG. 1). Additionally, the height-based shadowing system 106 is also part of the image editing system 104. As shown, in one or more embodiments, the height-based shadowing system 106 includes, but is not limited to, a neural network training engine 802, a neural network application manager 804, an object mask generator 806, an object cutout generator 808, a coordinate scheme manager 810, a shadow projection manager 812, a digital image modification engine 814, a graphical user interface manager 816, and data storage 818 (which includes a height prediction neural network 820, a shadow stylization neural network 822, and training digital images 824).

As just mentioned, and as illustrated in FIG. 8, the height-based shadowing system 106 includes the neural network training engine 802. In one or more embodiments, the neural network training engine 802 generates (e.g., trains) neural networks for use in generating an object shadow (e.g., a soft object shadow) for a digital object portrayed in a digital image. For instance, in some cases, the neural network training engine 802 generates a height prediction neural network for generating height maps for digital objects portrayed in digital images. Further, in some implementations, the neural network training engine 802 generates a shadow stylization neural network for generating soft object shadows for the digital objects.

As further shown in FIG. 8, the height-based shadowing system 106 includes the neural network application manager 804. In one or more embodiments, the neural network application manager 804 implements the neural networks generated by the neural network training engine 802. For instance, in some cases, the neural network application manager 804 utilizes the height prediction neural network generated by the neural network training engine 802 to generate height maps for digital object portrayed in digital images. Further, in some implementations, the neural network application manager 804 utilizes the shadow stylization neural network generated by the neural network training engine 802 to generate soft object shadows for the digital objects.

Additionally, as shown in FIG. 8, the height-based shadowing system 106 includes the object mask generator 806. In one or more embodiments, the object mask generator 806 generates object masks for digital objects portrayed in digital images. To illustrate, in some cases, the object mask generator 806 generates an object mask for a digital object portrayed in a digital image and provides the object mask to the height prediction neural network employed by the neural network application manager 804 to generate a height map for the digital object. Further, the object mask generator 806 provides the object mask to the shadow stylization neural network employed by the neural network application manager 804 to generate a soft object shadow for the digital object.

As shown in FIG. 8, the height-based shadowing system 106 further includes the object cutout generator 808. In one or more embodiments, the object cutout generator 808 generates object cutouts for digital objects portrayed in digital images. For instance, in some cases, the object cutout generator 808 generates an object cutout for a digital object portrayed in a digital image and provides the object cutout to the height prediction neural network employed by the neural network application manager 804 to generate a height map for the digital object. In some implementations, the object cutout generator 808 utilizes the object mask generated by the object mask generator 806 to generate the object cutout.

Additionally, as shown in FIG. 8, the height-based shadowing system 106 includes the coordinate scheme manager 810. In one or more embodiments, the coordinate scheme manager 810 determines and/or manages coordinate schemes for use in generating height maps. For instance, in some cases, the coordinate scheme manager 810 determines a coordinate scheme corresponding to a digital image via user input, user settings, or default settings. Further, the coordinate scheme manager 810 provides the coordinate scheme to the height prediction neural network employed by the neural network application manager 804 to generate a height map for the digital object.

As shown in FIG. 8, the height-based shadowing system 106 also includes the shadow projection manager 812. In one or more embodiments, the shadow projection manager 812 determines shadow projections for the pixels of a digital object portrayed in a digital image. For example, in some cases, the shadow projection manager 812 determines the shadow projections using a height map generated for the digital object by the neural network application manager 804 using a height prediction neural network. In some implementations, the shadow projection manager 812 further determines the shadow projections using light source information corresponding to the digital image. In some cases, the shadow projection manager 812 utilizes the determined shadow projections to generate shadow pixels corresponding to the pixels of the digital object. Further, in some embodiments, the shadow projection manager 812 generates a hard shadow mask for the for the digital image using the determined shadow projections (e.g., using the generated shadow pixels).

Additionally, as shown in FIG. 8, the height-based shadowing system 106 includes the digital image modification engine 814. In one or more embodiments, the digital image modification engine 814 modifies a digital image portraying a digital object to include an object shadow generated for the digital object. For instance, in some cases, the height-based shadowing system 106 modifies a digital image to include a soft object shadow generated by the neural network application manager 804 utilizing a shadow stylization neural network. In some cases, the digital image modification engine 814 modifies the object shadow within the digital image in response to one or more user interactions with the digital object, the object shadow, or other user interactions with the digital image.

Further, as shown in FIG. 8, the height-based shadowing system 106 includes the graphical user interface manager 816. In one or more embodiments, the graphical user interface manager 816 provides, for display within a graphical user interface, a digital image that has been modified to include an object shadow generated for a digital object portrayed therein. Further, in some implementations, the graphical user interface manager 816 provides one or more interactive elements, such as a softness control or a distortion control, that facilitates interaction with the displayed digital image. In some cases, the graphical user interface manager 816 further detects user interactions with the graphical user interface displaying the digital image.

Further, as shown, the height-based shadowing system 106 includes data storage 818. In particular, data storage 818 includes the height prediction neural network 820, the shadow stylization neural network 822, and training digital images 824. In one or more embodiments, the height prediction neural network 820 stores the height prediction neural network generated by the neural network training engine 802 and implemented by the neural network application manager 804 to generate height maps for digital objects portrayed in digital images. Similarly, in one or more embodiments, the shadow stylization neural network 822 stores the shadow stylization neural network generated by the neural network training engine 802 and implemented by the neural network application manager 804 to generate soft object shadows for digital objects portrayed in digital images. Further, in some embodiments, training digital images 824 store the training digital images used by the neural network training engine 802 to generate the height prediction neural network and/or the shadow stylization neural network. For instance, in some cases, training digital images 824 stores real training images and/or synthetic training images. In some implementations, training digital images 824 further stores the corresponding ground truths used for generating the neural networks.

Each of the components 802-824 of the height-based shadowing system 106 can include software, hardware, or both. For example, the components 802-824 can include one or more instructions stored on a computer-readable storage medium and executable by processors of one or more computing devices, such as a client device or server device. When executed by the one or more processors, the computer-executable instructions of the height-based shadowing system 106 can cause the computing device(s) to perform the methods described herein. Alternatively, the components 802-824 can include hardware, such as a special-purpose processing device to perform a certain function or group of functions. Alternatively, the components 802-824 of the height-based shadowing system 106 can include a combination of computer-executable instructions and hardware.

Furthermore, the components 802-824 of the height-based shadowing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-824 of the height-based shadowing system 106 may be implemented as a stand-alone application, such as a desktop or mobile application. Furthermore, the components 802-824 of the height-based shadowing system 106 may be implemented as one or more web-based applications hosted on a remote server. Alternatively, or additionally, the components 802-824 of the height-based shadowing system 106 may be implemented in a suite of mobile device applications or "apps." For example, in one or more embodiments, the height-based shadowing system 106 can comprise or operate in connection with digital software applications such as ADOBE® AFTER EFFECTS®, ADOBE® ILLUSTRA- TOR®, or ADOBE® PHOTOSHOP®. "ADOBE," "AFTER EFFECTS," "ILLUSTRATOR," and "PHOTOSHOP" are either registered trademarks or trademarks of Adobe Inc. in the United States and/or other countries.

Figure 9:
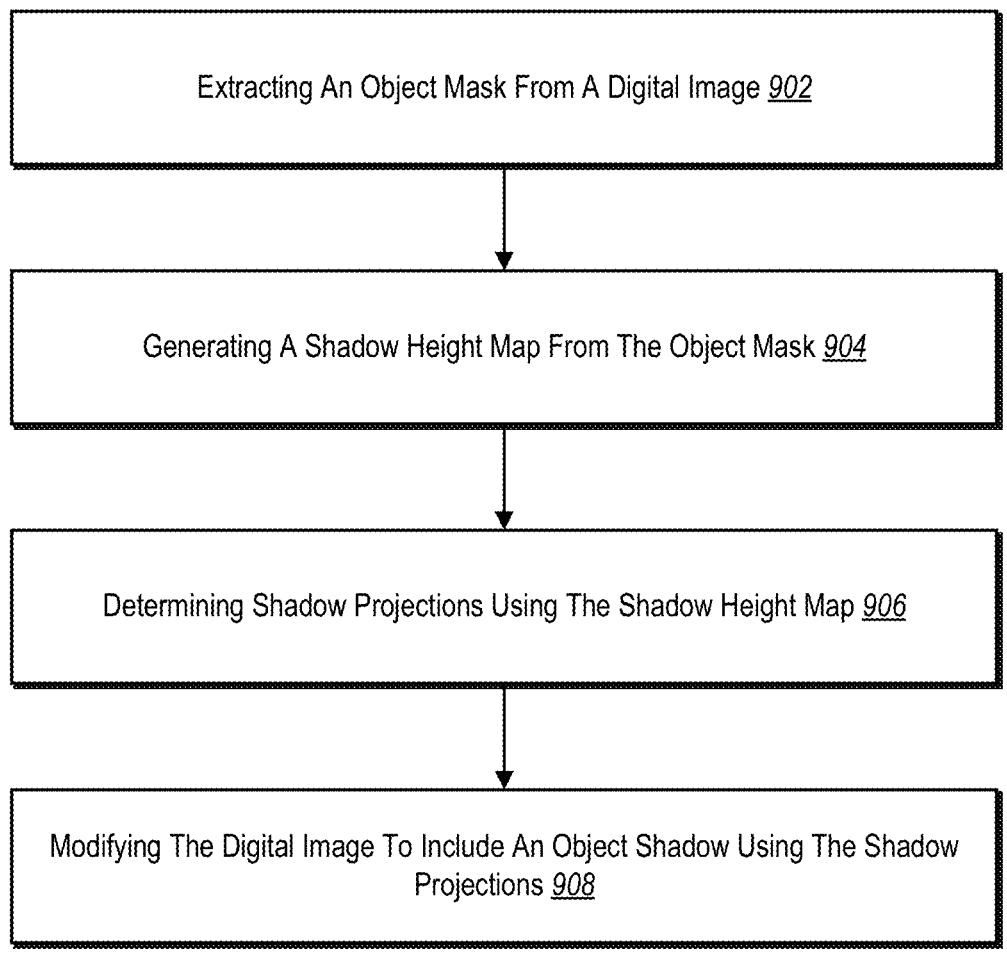
FIG. 9 illustrates a flowchart of a series of acts for generating an object shadow for a digital object portrayed in a digital image in accordance with one or more embodiments.

FIGS. 1-8, the corresponding text, and the examples provide a number of different methods, systems, devices, and non-transitory computer-readable media of the height-based shadowing system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating an object shadow for a digital object portrayed in a digital image in accordance with one or more embodiments. While FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed, in a digital medium environment for editing digital images, as part of a computer-implemented method for generating shadows for portrayed image objects. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device comprising a digital image portraying a digital object and a height prediction neural network. The system further includes at least one server device configured to cause the system to perform the acts of FIG. 9.

The series of acts 900 includes an act 902 of extracting an object mask from a digital image. For instance, in one or more embodiments, the act 902 involves extracting, from a digital image portraying a digital object, an object mask corresponding to the digital object.

The series of acts 900 also includes an act 904 of generating a height map from the object mask. For example, in some embodiments, the act 904 involves generating, utilizing a height prediction neural network, a height map from the object mask corresponding to the digital object, the height map comprising pixel heights for pixels of the digital object.

In one or more embodiments, the height-based shadowing system 106 further determines an object cutout for the digital object and a coordinate scheme corresponding to the digital image. Accordingly, in some cases, the height-based shadowing system 106 generates, utilizing the height prediction neural network, the height map from the object mask corresponding to the digital object by generating, utilizing the height prediction neural network, the height map from the object mask, the object cutout, and the coordinate scheme.

Additionally, the series of acts 900 includes an act 906 of determining shadow projections using the shadow height map. To illustrate, in some implementations, the act 906 involves determining shadow projections for the pixels of the digital object using the pixel heights from the height map and light source information for the digital image. Indeed, in one or more embodiments, the height-based shadowing system 106 determines a shadow projection of the digital object portrayed in the digital image using the height map.

In some cases, the height-based shadowing system 106 determines the shadow projection by determining shadow projections for the pixels of the digital object.

In some embodiments, the height-based shadowing system 106 determines the shadow projections for the pixels of the digital object using the pixel heights from the height map and the light source information for the digital image by determining, for each pixel of the digital object, a position of a corresponding shadow pixel within the digital image utilizing a corresponding pixel height from the height map and the light source information. In one or more embodiments, determining, for each pixel of the digital object, a position of a corresponding shadow pixel within the digital image utilizing a corresponding pixel height from the height map and the light source information comprises: determining a vertical position of the corresponding shadow pixel utilizing the corresponding pixel height, a position of the pixel within the digital image, a position of a light source for the digital image, and a position of a horizon associated with the digital image; and determining a horizontal position of the corresponding shadow pixel utilizing the position of the pixel within the digital image and the position of the light source for the digital image.

In some embodiments, the height-based shadowing system 106 determines the shadow projections for the pixels of the digital object by determining the shadow projections for the pixels of the digital object based on the height map utilizing one of a forward tracing projection model or a back tracing projection model.

In one or more embodiments, determining the shadow projection of the digital object (e.g., determining the shadow projections for the pixels of the digital object) portrayed in the digital image using the height map comprises determining the shadow projection (e.g., the shadow projections) onto a non-planar surface portrayed in the digital image.

Further, the series of acts 900 includes an act 908 of modifying the digital image to include an object shadow using the shadow projections. For instance, in some cases, the act 908 involves modifying the digital image to include an object shadow for the digital object using the shadow projections for the pixels of the digital object. Indeed, in one or more embodiments, the height-based shadowing system 106 modifies the digital image to include an object shadow for the digital object using the shadow projection. Accordingly, in some cases, the height-based shadowing system 106 uses the shadow projection for the digital object by using the shadow projections for the pixels of the digital object.

In one or more embodiments, modifying the digital image to include the object shadow for the digital object using the shadow projection (e.g., using the shadow projections for the pixels of the digital object) comprises modifying the digital image to include the object shadow cast from the digital object and across a non-planar surface.

In some implementations, modifying the digital image to include the object shadow for the digital object comprises modifying the digital image to include a soft object shadow associated with the digital object. Indeed, in one or more embodiments, the height-based shadowing system 106 generates a soft object shadow for the digital object using the shadow projections for the pixels of the digital object. Accordingly, in some cases, the height-based shadowing system 106 modifies the digital image to include the object shadow for the digital object by modifying the digital image to include the soft object shadow for the digital object. In one or more embodiments, the height-based shadowing system 106 generates the soft object shadow for the digital object by generating the soft object shadow utilizing a shadow stylization neural network.

In some cases, the height-based shadowing system 106 generates a hard shadow mask for the digital object using the shadow projections for the pixels of the digital object. Accordingly, in one or more embodiments, the height-based shadowing system 106 generates the soft object shadow for the digital object using the shadow projections for the pixels of the digital object by generating the soft object shadow for the digital object using the hard shadow mask and the object mask corresponding to the digital object.

In one or more embodiments, the series of acts 900 further include acts for providing the digital image for display within a graphical user interface and/or modifying the object shadow generated for the digital object based on one or more user interactions detected via the graphical user interface. For instance, in one or more embodiments, the acts involve providing the digital image with the object shadow for display within a graphical user interface of a client device; detecting, via the graphical user interface, one or more user interactions repositioning the digital object within the digital image; and modifying the object shadow within the digital image based on the one or more user interactions repositioning the digital object. In some cases, the acts include providing the digital image with the soft object shadow for display within a graphical user interface of a client device; detecting, via the graphical user interface, one or more user interactions with a softness control corresponding to the soft object shadow; and modifying a softness of the soft object shadow in accordance with the one or more user interactions with the softness control.

In some embodiments, the acts include detecting, via a graphical user interface of a client device displaying the digital image with the object shadow, a user interaction moving the digital object vertically within the digital image; generating modified pixel heights for the height map by adding a shift value to the pixel heights based on the user interaction moving the digital object vertically within the digital image; and modifying the object shadow within the digital image using the modified pixel heights. In some implementations, the acts include providing the digital image with the object shadow for display within a graphical user interface of a client device; detecting, via the graphical user interface, one or more user interactions for repositioning the object shadow within the digital image; and modifying the object shadow within the digital image based on the one or more user interactions repositioning the object shadow. In some cases, the height-based shadowing system 106 modifies an additional object shadow corresponding to an additional digital object portrayed in the digital image based on the one or more user interactions repositioning the object shadow corresponding to the digital object.

To provide an illustration, in one or more embodiments, the height-based shadowing system 106 extracts, from the digital image, an object mask corresponding to the digital object; generates, utilizing a height prediction neural network, a height map from the object mask corresponding to the digital object, the height map comprising pixel heights for pixels of the digital object within an image space; determines shadow projections for the pixels of the digital object by determining, for a pixel of the digital object, a position of a corresponding shadow pixel within the digital image utilizing a corresponding pixel height from the height map, a position of a light source for the digital image, and a projection of the light source onto a horizon associated with the digital image; and modifies the digital image to include an object shadow for the digital object using the shadow projections for the pixels of the digital object.

In some cases, the height-based shadowing system 106 modifies the digital image to include the object shadow for the digital object using the shadow projections for the pixels of the digital object by: generating, utilizing a shadow stylization neural network, a soft object shadow for the digital object based on the shadow projections for the pixels of the digital object; and modifying the digital image to include the soft object shadow for the digital object. In some embodiments, generating the soft object shadow for the digital object utilizing the shadow stylization neural network based on the shadow projections comprises generating the soft object shadow for the digital object utilizing the shadow stylization neural network based on the shadow projections and a softness value determined via a user input.

Further, in one or more embodiments, the height-based shadowing system 106 determines a two-dimensional object cutout for the digital object and a two-dimensional coordinate scheme corresponding to the digital image; and generates, utilizing the height prediction neural network, the height map from the object mask corresponding to the digital object by generating, utilizing the height prediction neural network, the height map from the object mask, the two-dimensional object cutout, and the two-dimensional coordinate scheme.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
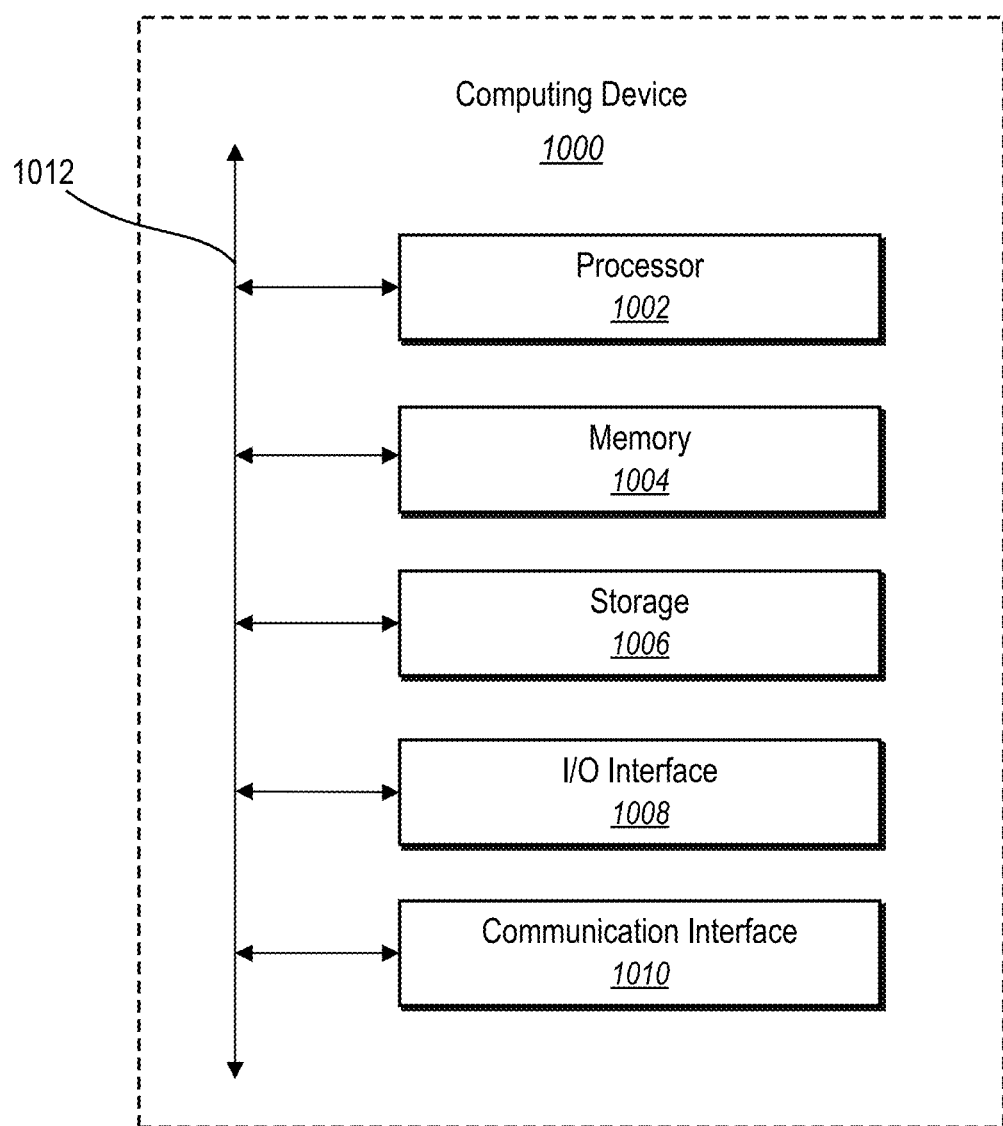
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    extracting, from a digital image portraying a digital object, an object mask corresponding to the digital object;
    generating, utilizing a height prediction neural network, a height map from the object mask corresponding to the digital object, the height map comprising pixel heights for pixels of the digital object;
    determining vertical projections of the pixels of the digital object onto a surface portrayed in the digital image using the pixel heights for the pixels in the height map;
    determining shadow projections for the pixels of the digital object using the pixel heights from the height map and a light source for the digital image by determining, as a location of a shadow pixel corresponding to a pixel of the digital object, an intersection between a first line that includes the light source and the pixel and a second line that includes a vertical projection of the light source onto a horizon of the digital image and a vertical projection of the pixel onto the surface determined using the height map; and
    modifying the digital image to include an object shadow for the digital object using the shadow projections for the pixels of the digital object.

2. The computer implemented method of claim 1, wherein modifying the digital image to include the object shadow for the digital object comprises modifying the digital image to include a soft object shadow associated with the digital object.

3. The method of claim 1, further comprising:
    providing the digital image with the object shadow for display within a graphical user interface of a client device;
    detecting, via the graphical user interface, one or more user interactions repositioning the digital object within the digital image; and
    modifying the object shadow within the digital image based on the one or more user interactions repositioning the digital object.

4. The method of claim 1, wherein:
    determining the shadow projections for the pixels of the digital object portrayed in the digital image using the pixel heights from the height map comprises determining the shadow projections onto a non-planar surface portrayed in the digital image; and
    modifying the digital image to include the object shadow for the digital object using the shadow projections for the pixels of the digital object comprises modifying the digital image to include the object shadow cast from the digital object and across the non-planar surface.

5. A non-transitory computer-readable medium storing executable instructions that, when executed by a processing device, cause the processing device to perform operations comprising:
    extracting, from a digital image portraying a digital object, an object mask corresponding to the digital object;
    generating, utilizing a height prediction neural network, a height map from the object mask corresponding to the digital object, the height map comprising pixel heights for pixels of the digital object;
    determining vertical projections of the pixels of the digital object onto a surface portrayed in the digital image using the pixel heights for the pixels in the height map;
    determining shadow projections for the pixels of the digital object using the pixel heights from the height map and a light source for the digital image by determining, as a location of a shadow pixel corresponding to a pixel of the digital object, an intersection between a first line that includes the light source and the pixel and a second line that includes a vertical projection of the light source onto a horizon of the digital image and a vertical projection of the pixel onto the surface determined using the height map; and modifying the digital image to include an object shadow for the digital object using the shadow projections for the pixels of the digital object.

6. The non-transitory computer-readable medium of claim 5, wherein:
the operations further comprise generating a soft object shadow for the digital object using the shadow projections for the pixels of the digital object; and
modifying the digital image to include the object shadow for the digital object comprises modifying the digital image to include the soft object shadow for the digital object.

7. The non-transitory computer-readable medium of claim 6, wherein generating the soft object shadow for the digital object comprises generating the soft object shadow utilizing a shadow stylization neural network.

8. The non-transitory computer-readable medium of claim 6, wherein:
the operations further comprise generating a hard shadow mask for the digital object using the shadow projections for the pixels of the digital object; and
generating the soft object shadow for the digital object using the shadow projections for the pixels of the digital object comprises generating the soft object shadow for the digital object using the hard shadow mask and the object mask corresponding to the digital object.

9. The non-transitory computer-readable medium of claim 6, wherein the operations further comprises:
providing the digital image with the soft object shadow for display within a graphical user interface of a client device;
detecting, via the graphical user interface, one or more user interactions with a softness control corresponding to the soft object shadow; and
modifying a softness of the soft object shadow in accordance with the one or more user interactions with the softness control.

10. The non-transitory computer-readable medium of claim 5, to wherein the operations further comprise:
detecting, via a graphical user interface of a client device displaying the digital image with the object shadow, a user interaction moving the digital object vertically within the digital image;
generating modified pixel heights for the height map by adding a shift value to the pixel heights based on the user interaction moving the digital object vertically within the digital image; and
modifying the object shadow within the digital image using the modified pixel heights.

11. The non-transitory computer-readable medium of claim 5, wherein:
the operations further comprise determining an object cutout for the digital object and a coordinate scheme corresponding to the digital image; and
generating, utilizing the height prediction neural network, the height map from the object mask corresponding to the digital object comprises generating, utilizing the height prediction neural network, the height map from the object mask, the object cutout, and the coordinate scheme.

12. The non-transitory computer-readable medium of claim 5, wherein the operations further comprise determining a location of the horizon of the digital image by receiving, via a client device displaying the digital image, user input indicating the location of the horizon.

13. The non-transitory computer-readable medium of claim 5, wherein the operations further comprise determining a location of the horizon of the digital image based on one or more shadows already present within the digital image.

14. A system comprising:
at least one memory component comprising:
at least one processing device coupled to the at least one memory component, the at least one processing device to perform operations comprising:
extracting, from a digital image, an object mask corresponding to a digital object portrayed within the digital image;
generating, utilizing a height prediction neural network, a height map from the object mask corresponding to the digital object, the height map comprising pixel heights for pixels of the digital object within an image space;
determining vertical projections of the pixels of the digital object onto a surface portrayed in the digital image using the pixel heights for the pixels in the height map;
determining shadow projections for the pixels of the digital object by determining, for a pixel of the digital object, a position of a corresponding shadow pixel within the digital image based on an intersection between a first line that includes a light source for the digital image and the pixel and a second line that includes a vertical projection of the light source onto a horizon of the digital image and a vertical projection of the pixel onto the surface determined using the height map; and
modifying the digital image to include an object shadow for the digital object using the shadow projections for the pixels of the digital object.

15. The system of claim 14, wherein determining the shadow projections for the pixels of the digital object comprises determining the shadow projections for the pixels of the digital object based on the height map utilizing one of a forward tracing projection model or a back tracing projection model.

16. The system of claim 14, wherein the operations further comprise:
providing the digital image with the object shadow for display within a graphical user interface of a client device;
detecting, via the graphical user interface, one or more user interactions for repositioning the object shadow within the digital image; and
modifying the object shadow within the digital image based on the one or more user interactions repositioning the object shadow.

17. The system of claim 16, wherein the operations further comprise modifying an additional object shadow corresponding to an additional digital object portrayed in the digital image based on the one or more user interactions repositioning the object shadow corresponding to the digital object.

18. The system of claim 14, wherein modifying the digital image to include the object shadow for the digital object using the shadow projections for the pixels of the digital object comprises:

generating, utilizing a shadow stylization neural network, a soft object shadow for the digital object based on the shadow projections for the pixels of the digital object; and modifying the digital image to include the soft object shadow for the digital object.

19. The system of claim 18, wherein generating the soft object shadow for the digital object utilizing the shadow stylization neural network based on the shadow projections comprises generating the soft object shadow for the digital object utilizing the shadow stylization neural network based on the shadow projections and a softness value determined via a user input.

20. The system of claim 14, wherein:
the operations further comprise determining a two-dimensional object cutout for the digital object and a two-dimensional coordinate scheme corresponding to the digital image; and
generating, utilizing the height prediction neural network, the height map from the object mask corresponding to the digital object comprises generating, utilizing the height prediction neural network, the height map from the object mask, the two-dimensional object cutout, and the two-dimensional coordinate scheme.

\* \* \* \* \*